US011256541B2

(12) United States Patent
Okuno et al.

(10) Patent No.: US 11,256,541 B2
(45) Date of Patent: Feb. 22, 2022

(54) RESCHEDULING OF VIRTUAL MACHINE MIGRATIONS WITH LESS IMPACT ON AN EXISTING MIGRATION SCHEDULE

(71) Applicant: FUJITSU LIMITED, Kawasaki (JP)

(72) Inventors: Shingo Okuno, Kawasaki (JP); Yukihiro Watanabe, Kawasaki (JP); Fumi Iikura, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 254 days.

(21) Appl. No.: 16/773,249

(22) Filed: Jan. 27, 2020

(65) Prior Publication Data
US 2020/0257554 A1    Aug. 13, 2020

(30) Foreign Application Priority Data
Feb. 8, 2019 (JP) .............................. JP2019-021387

(51) Int. Cl.
*G06F 9/455* (2018.01)
*G06F 9/48* (2006.01)

(52) U.S. Cl.
CPC ........ *G06F 9/4856* (2013.01); *G06F 9/45558* (2013.01); *G06F 2009/4557* (2013.01); *G06F 2209/485* (2013.01); *G06F 2209/486* (2013.01)

(58) Field of Classification Search
CPC .................................................. G06F 9/45558
(Continued)

(56) References Cited

U.S. PATENT DOCUMENTS

| 8,850,434 | B1 * | 9/2014 | Butikofer | .............. | G06F 9/5088 |
| | | | | | 718/1 |
| 2009/0007106 | A1 * | 1/2009 | Araujo, Jr. | .......... | G06F 9/45558 |
| | | | | | 718/1 |

(Continued)

FOREIGN PATENT DOCUMENTS

| JP | 11-215702 | 8/1999 |
| JP | 2005-267591 | 9/2005 |

(Continued)

OTHER PUBLICATIONS

A. Nadel, "Boosting Minimal Unsatisfiable Core Extraction", in Proc. FMCAD' 10, pp. 221-229, 2010.

(Continued)

*Primary Examiner* — Mehran Kamran
(74) *Attorney, Agent, or Firm* — Staas & Halsey LLP

(57) ABSTRACT

An apparatus, for an existing schedule indicating time slots during which virtual-machines are to be migrated between physical-machines, acquires change information indicating a change of first time slots during which first virtual-machines are to be migrated, and generates constraint information including a group of constraints regarding the change information and second time slots during which second virtual-machines other than the first virtual-machines are to be migrated. The apparatus generates semi-constraint information items each generated by excluding, from the constraint information, an exclusion target constraint that is selected in turn from among the group of constraints, and generates, for each semi-constraint information item, a rescheduling result by rescheduling migrations of the virtual-machines. The apparatus outputs a first rescheduling result that is one of the generated rescheduling results which reduces a difference between a scheduled migration time (Continued)

indicated by the first rescheduling result and scheduled migration times of the second virtual-machines.

10 Claims, 34 Drawing Sheets

(58) Field of Classification Search
USPC .................................................. 718/1
See application file for complete search history.

(56) References Cited

U.S. PATENT DOCUMENTS

| | | | | |
|---|---|---|---|---|
| 2010/0161922 | A1* | 6/2010 | Sharp | G06F 9/45558 711/162 |
| 2010/0332889 | A1* | 12/2010 | Shneorson | G06Q 10/04 714/2 |
| 2012/0011254 | A1* | 1/2012 | Jamjoom | G06F 9/4856 709/226 |
| 2013/0346973 | A1* | 12/2013 | Oda | G06F 9/4856 718/1 |
| 2014/0068343 | A1* | 3/2014 | Nakajima | G06F 11/0751 714/39 |
| 2014/0380079 | A1* | 12/2014 | Katano | G06F 11/1441 713/330 |
| 2015/0160972 | A1* | 6/2015 | Yu | G06F 9/4856 718/1 |
| 2017/0149687 | A1* | 5/2017 | Udupi | H04L 47/78 |
| 2018/0046489 | A1* | 2/2018 | Onoue | G06F 9/45558 |
| 2019/0095232 | A1* | 3/2019 | Okuno | G06F 9/45558 |
| 2019/0286475 | A1* | 9/2019 | Mani | G06F 9/45558 |
| 2020/0042340 | A1* | 2/2020 | Wiggers | G06F 9/4856 |
| 2020/0117494 | A1* | 4/2020 | Cortez | G06F 9/5088 |
| 2020/0142732 | A1* | 5/2020 | Okuno | G06F 9/5044 |

FOREIGN PATENT DOCUMENTS

| | | |
|---|---|---|
| JP | 2011-8780 | 1/2011 |
| JP | 2013-182303 | 9/2013 |

OTHER PUBLICATIONS

H. Hattori et al., "A Nurse Scheduling System Based on Dynamic Constraint Satisfaction Problem", In Proc. IEA/AIE 2005, pp. 799-808, 2005.

* cited by examiner

| MAINTENANCE EXECUTION DURATION INFORMATION ||
|---|---|
| START DATE AND TIME | END DATE AND TIME |
| 2018-06-01T12:00:00.000Z | 2018-06-30T11:59:00.000Z |

FIG. 8

| MAINTENANCE TARGET MACHINE INFORMATION ||
|---|---|
| PHYSICAL MACHINE NAME | MAINTENANCE TURNAROUND TIME |
| PM01 | 01:00:00.000 |
| PM02 | 02:00:00.000 |
| ... | ... |

FIG. 9

INFRASTRUCTURE CONFIGURATION INFORMATION STORAGE UNIT

| PHYSICAL MACHINE CONFIGURATION TABLE ||||
|---|---|---|---|
| PHYSICAL MACHINE NAME | NUMBER OF CPU CORES | MEMORY CAPACITY | DISK CAPACITY |
| PM01 | 64 | 256 GB | 32 TB |
| PM02 | 32 | 128 GB | 128 TB |
| ... | ... | ... | ... |

FIG. 10

INFRASTRUCTURE CONFIGURATION INFORMATION STORAGE UNIT — 111

VIRTUAL MACHINE CONFIGURATION TABLE — 142

| VIRTUAL MACHINE NAME | USER ID | NUMBER OF CPU CORES | MEMORY CAPACITY | DISK CAPACITY | LM TURNAROUND TIME |
|---|---|---|---|---|---|
| accounting-db-13 | user1 | 2 | 32 GB | 2 TB | 25 MINUTES |
| vm-67 | user2 | 2 | 2 GB | 32 TB | 8 MINUTES |
| server-90 | user3 | 8 | 8 GB | 64 TB | 15 MINUTES |
| mysql-67 | user3 | 4 | 4 GB | 128 TB | 10 MINUTES |
| accounting-db-03 | user1 | 2 | 16 GB | 2 TB | 20 MINUTES |
| accounting-web-03 | user1 | 4 | 16 GB | 256 TB | 20 MINUTES |
| ... | ... | ... | ... | ... | ... |

FIG. 11

INFRASTRUCTURE CONFIGURATION INFORMATION STORAGE UNIT 111

VIRTUAL MACHINE OPERATION TABLE 143

| PHYSICAL MACHINE NAME | VIRTUAL MACHINE NAME | USER ID |
|---|---|---|
| PM01 | server-90 | user3 |
| | mysql-67 | user3 |
| | accounting-db-03 | user1 |
| | accounting-web-03 | user1 |
| ... | ... | ... |
| PM05 | accounting-db-13 | user1 |
| | vm-67 | user2 |
| ... | ... | ... |

FIG. 12

111 — INFRASTRUCTURE CONFIGURATION INFORMATION STORAGE UNIT

144 — DEPENDENCY RELATION TABLE

| GROUP NAME | VIRTUAL MACHINE NAME | RULE |
|---|---|---|
| G01 | accounting-db-13 | anti-affinity |
| | accounting-db-03 | |
| G02 | accounting-db-03 | affinity |
| | accounting-web-03 | |
| ... | ... | ... |

FIG. 13

121 — CONSTRAINT CONDITION STORAGE UNIT

145 — MINIMAL UNSATISFIABLE CORE INFORMATION

| VIRTUAL MACHINE NAME |
|---|
| vm-67 |
| server-90 |
| accounting-web-03 |
| ... |

FIG. 14

VM PRIORITY STORAGE UNIT — 122

PRIORITY TABLE — 146

| VIRTUAL MACHINE NAME | PRIORITY |
|---|---|
| accounting-db-13 | 22 |
| vm-67 | 42 |
| server-90 | 4 |
| mysql-67 | 6 |
| accounting-db-03 | 20 |
| accounting-web-03 | 24 |
| ... | ... |

| PRIORITY | VIRTUAL MACHINE NAME | USAGE | | SCHEDULED LM EXECUTION TIME |
|---|---|---|---|---|
| | | USAGE FEE | PERIOD OF USE | |
| 1 | server-42 | HIGH | LONG | JUNE 5 9:00 ~ |
| 2 | mysql-101 | HIGH | LONG | JUNE 5 9:10 ~ |
| 3 | web-db-251 | HIGH | LONG | JUNE 5 9:15 ~ |
| ... | ... | ... | ... | ... |

FIG. 16

EVENT INFORMATION STORAGE UNIT 123

MAINTENANCE SCHEDULE TABLE (BEFORE CHANGE) 151

| VIRTUAL MACHINE NAME | START DATE AND TIME | END DATE AND TIME |
|---|---|---|
| PM01 | 2018-06-20T11:30:00.000Z | 2018-06-20T12:29:00.000Z |
| ... | ... | ... |

FIG. 17

EVENT INFORMATION STORAGE UNIT 123

LM SCHEDULE TABLE (BEFORE CHANGE) 152

| VIRTUAL MACHINE NAME | START DATE AND TIME | END DATE AND TIME | MIGRATION SOURCE | MIGRATION DESTINATION |
|---|---|---|---|---|
| ... | ... | ... | ... | ... |
| server-90 | 2018-06-20T09:45:00.000Z | 2018-06-20T09:59:00.000Z | PM01 | PM02 |
| accounting-db-03 | 2018-06-20T10:10:00.000Z | 2018-06-20T10:29:00.000Z | PM01 | PM02 |
| accounting-web-03 | 2018-06-20T10:10:00.000Z | 2018-06-20T10:29:00.000Z | PM01 | PM02 |
| mysql-67 | 2018-06-20T10:55:00.000Z | 2018-06-20T11:04:00.000Z | PM01 | PM02 |
| ... | ... | ... | ... | ... |

FIG. 18

| VIRTUAL MACHINE NAME | LM EXECUTION DATE AND TIME CHANGE REQUEST INFORMATION ~133 | | |
|---|---|---|---|
| | START DATE AND TIME | END DATE AND TIME | ATTRIBUTE |
| ... | ... | ... | ... |
| mysql-67 | 2018-06-20T10:40:00.000Z | 2018-06-20T13:59:00.000Z | AVOIDED |
| accounting-db-13 | 2018-06-22T18:00:00.000Z | 2018-06-22T20:59:00.000Z | ALLOWED |
| ... | ... | ... | ... |

FIG. 19

EVENT INFORMATION STORAGE UNIT ~123

MAINTENANCE SCHEDULE TABLE (AFTER CHANGE) ~153

| PHYSICAL MACHINE NAME | START DATE AND TIME | END DATE AND TIME |
|---|---|---|
| PM01 | 2018-06-20T10:30:00.000Z | 2018-06-20T11:29:00.000Z |
| ... | ... | ... |

LM SCHEDULE TABLE (AFTER CHANGE) ~154

| VIRTUAL MACHINE NAME | START DATE AND TIME | END DATE AND TIME | MIGRATION SOURCE | MIGRATION DESTINATION |
|---|---|---|---|---|
| ... | ... | ... | ... | ... |
| server-90 | 2018-06-20T09:45:00.000Z | 2018-06-20T09:59:00.000Z | PM01 | PM02 |
| mysql-67 | 2018-06-20T10:00:00.000Z | 2018-06-20T10:09:00.000Z | PM01 | PM02 |
| accounting-db-03 | 2018-06-20T10:10:00.000Z | 2018-06-20T10:29:00.000Z | PM01 | PM02 |
| accounting-web-03 | 2018-06-20T10:10:00.000Z | 2018-06-20T10:29:00.000Z | PM01 | PM02 |
| ... | ... | ... | ... | ... |

FIG. 20

| | |
|---|---|
| $t_s$ | # START DATE AND TIME OF MAINTENANCE EXECUTION DURATION |
| $t_e$ | # END DATE AND TIME OF MAINTENANCE EXECUTION DURATION |
| $T=\{t_s, ..., t_e\}$ | # MAINTENANCE EXECUTION DURATION |
| $P$ | # MAINTENANCE TARGET PHYSICAL MACHINE (PM) |
| $maintDuration_p$ | # MAINTENANCE TURNAROUND TIME OF $PM_p$ |
| $cpuCap_p$ | # NUMBER OF CPU CORES OF $PM_p$ |
| $ramCap_p$ | # MEMORY CAPACITY OF $PM_p$ |
| $diskCap_p$ | # DISK CAPACITY OF $PM_p$ |
| $V$ | # SCHEDULE ADJUSTMENT TARGET VIRTUAL MACHINE (VM) |
| $initAccommo_{pv}$ | # 1 IF $VM_v$ IS INITIALLY ALLOCATED TO $PM_p$ (OTHERWISE 0) |
| $migrationDuration_v$ | # LM TURNAROUND TIME OF $VM_v$ |
| $cpuReq_v$ | # NUMBER OF CPU CORES OF $VM_v$ |
| $ramReq_v$ | # MEMORY CAPACITY OF $VM_v$ |
| $diskReq_v$ | # DISK CAPACITY OF $VM_v$ |
| $availMigrationTimeSlot_v(t)$ | # 1 IF LM OF $VM_v$ IS ALLOWED TO BE EXECUTED AT TIME t (OTHERWISE 0) |
| $numG_{af}$ | # NUMBER OF GROUPS UNDER APPLICATION OF affinity RULE |
| $G_{af}=\{G_{af\_1}, ..., G_{af\_numGaf}\}$ | # SET OF GROUPS UNDER APPLICATION OF affinity RULE |
| $numG_{aa}$ | # NUMBER OF GROUPS UNDER APPLICATION OF anti-affinity RULE |
| $G_{aa}=\{G_{aa\_1}, ..., G_{aa\_numGaa}\}$ | # SET OF GROUPS UNDER APPLICATION OF anti-affinity RULE |
| $m_p(t)$ | # 1 IF $PM_p$ IS UNDER MAINTENANCE AT TIME t (OTHERWISE 0) |
| $a_{pv}(t)$ | # 1 IF $VM_v$ IS IN OPERATION ON $PM_p$ AT TIME t (OTHERWISE 0) |
| $l_{pv}(t)$ | # 1 IF LM OF $VM_v$ TO $PM_p$ IS COMPLETED AT TIME t (OTHERWISE 0) |

EXEMPLARY migrationDuration$_v$

| migrationDuration$_v$ | ... | $t_i$ | $t_{i+1}$ | $t_{i+2}$ | $t_{i+3}$ | $t_{i+4}$ | $t_{i+5}$ | ... |
|---|---|---|---|---|---|---|---|---|
| v1 | ... | 3 | 4 | 2 | 4 | 6 | 5 | ... |
| v2 | ... | 8 | 6 | 7 | 5 | 3 | 4 | ... |
| ⋮ | ... | ... | ... | ... | ... | ... | ... | ... |

EXEMPLARY $I_{pv}$

| $I_{pv}(t)$, p=C | ... | $t_i$ | $t_{i+1}$ | $t_{i+2}$ | $t_{i+3}$ | $t_{i+4}$ | $t_{i+5}$ | ... |
|---|---|---|---|---|---|---|---|---|
| v1 | ... | 0 | 0 | 1 | 0 | 0 | 0 | ... |
| v2 | ... | 0 | 0 | 0 | 0 | 1 | 0 | ... |
| ⋮ | ... | ... | ... | ... | ... | ... | ... | ... |

EXEMPLARY p FOR $a_{pv}(t) == 1$

| p FOR $a_{pv}(t)==1$ | ... | $t_i$ | $t_{i+1}$ | $t_{i+2}$ | $t_{i+3}$ | $t_{i+4}$ | $t_{i+5}$ | ... |
|---|---|---|---|---|---|---|---|---|
| v1 | ... | A | A | A | C | C | C | ... |
| v2 | ... | B | B | B | B | B | C | ... |
| ⋮ | ... | ... | ... | ... | ... | ... | ... | ... |

FIG. 28

```
V :=
"accounting-db-13"
"vm-67"
"server-90"
"mysql-67"
"accounting-db-03"
"accounting-web-03"
...
;
```
⎬ VM NAME ON EACH LINE

```
initAccommo_pv :=
...
"PM01" "mysql-67" 1
"PM02" "mysql-67" 0
"PM01" "accounting-db-03" 1
"PM02" "accounting-db-03" 0
...
;
```
⎬ "PM NAME" "VM NAME" "0 or 1"

FIG. 29

```
migrationDuration_V :=
...
"server-90" 15
"mysql-67" 10
"accounting-db-03" 20
"accounting-web-03" 30
...
;
```

"VM NAME"
"LM TURNAROUND TIME (MINUTES)"

$I_{pv}(t) =$
"PM01" "server-90" 27238 0
"PM01" "server-90" 27239 0
"PM01" "server-90" 27240 0
"PM01" "server-90" 27241 0
...
"PM01" "mysql-67" 27248 0
"PM01" "mysql-67" 27249 0
"PM01" "mysql-67" 27250 0
"PM01" "mysql-67" 27251 0
...
"PM02" "server-90" 27238 0
"PM02" "server-90" 27239 1
"PM02" "server-90" 27240 0
"PM02" "server-90" 27241 0
...
"PM02" "mysql-67" 27248 0
"PM02" "mysql-67" 27249 1
"PM02" "mysql-67" 27250 0
"PM02" "mysql-67" 27251 0
...
;

27238: JUNE 20, 2018 9:58
27239: JUNE 20, 2018 9:59
27240: JUNE 20, 2018 10:00
27241: JUNE 20, 2018 10:01

"PM NAME" "VM NAME" "TIME" "0 or 1"

27248: JUNE 20, 2018 10:08
27249: JUNE 20, 2018 10:09
27250: JUNE 20, 2018 10:10
27251: JUNE 20, 2018 10:11

168

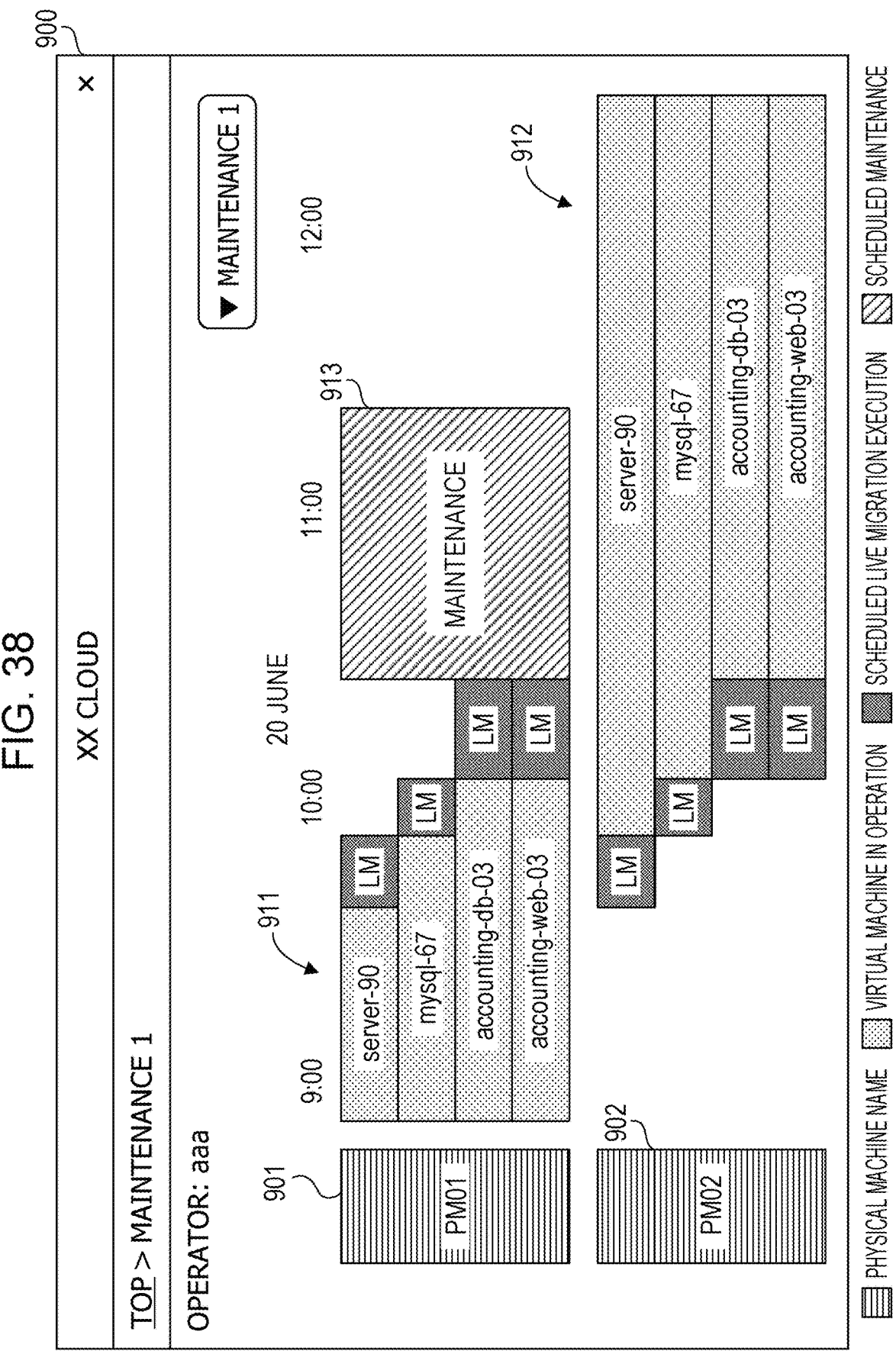

RESCHEDULING OF VIRTUAL MACHINE MIGRATIONS WITH LESS IMPACT ON AN EXISTING MIGRATION SCHEDULE

CROSS-REFERENCE TO RELATED APPLICATION

This application is based upon and claims the benefit of priority of the prior Japanese Patent Application No. 2019-21387, filed on Feb. 8, 2019, the entire contents of which are incorporated herein by reference.

FIELD

The embodiments discussed herein are related to rescheduling of virtual machine migrations with less impact on an existing migration schedule.

BACKGROUND

In virtualization technology used in the field of information processing, a plurality of virtual computers (also referred to as virtual machines or virtual hosts) operate on a physical computer (also referred to as a physical machine or a physical host). Software such as an operating system (OS) is executed on each virtual machine. A physical machine using the virtualization technology executes software for managing a plurality of virtual machines. For example, software called hypervisor allocates the processing capacity of a central processing unit (CPU) and a storage region of a random-access memory (RAM) as computation resources to the plurality of virtual machines.

In some systems including a plurality of physical machines, a virtual machine running on one physical machine may be moved to another physical machine. Such movement of virtual machines is sometimes called migration. For example, migration without significant interruption of a virtual machine from one physical computer system to another physical computer system is called live migration (LM).

A power system supply and demand plan creation device has been proposed, which automatically and quickly creates a practical operation plan that satisfies all the constraints to be considered in operation and that is low in operation cost.

Related techniques are disclosed in, for example, Japanese Laid-open Patent Publication Nos. 2011-8780 and 11-215702.

SUMMARY

According to an aspect of the embodiments, an apparatus acquires, for an existing schedule indicating time slots during which a plurality of virtual machines are to be migrated between a plurality of physical machines, change information indicating a change of first time slots during which first virtual machines are to be migrated, and generates constraint information including a group of constraints regarding the change information and second time slots during which second virtual machines other than the first virtual machines are to be migrated. The apparatus generates a plurality of semi-constraint information items each generated by excluding, from the constraint information, an exclusion target constraint that is selected in turn from among the group of constraints, and generates, for each of the plurality of semi-constraint information items, a rescheduling result by rescheduling migrations of the plurality of virtual machines. The apparatus outputs a first rescheduling result that is one of the generated rescheduling results which reduces a difference between a scheduled migration time indicated by the first rescheduling result and scheduled migration times of the second virtual machines.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating exemplary maintenance target machine information;

FIG. 9 is a diagram illustrating an exemplary physical machine configuration table;

FIG. 10 is a diagram illustrating an exemplary virtual machine configuration table;

FIG. 11 is a diagram illustrating an exemplary virtual machine operation table;

FIG. 12 is a diagram illustrating an exemplary dependency relation table;

FIG. 13 is a diagram illustrating exemplary minimal unsatisfiable core information;

FIG. 14 is a diagram illustrating an exemplary priority table;

FIG. 15 is a diagram illustrating exemplary priority determination;

FIG. 16 is a diagram illustrating an exemplary maintenance schedule table (before change);

FIG. 17 is a diagram illustrating an exemplary LM schedule table (before change);

FIG. 18 is a diagram illustrating exemplary LM execution date and time change request information;

FIG. 19 is a diagram illustrating an exemplary schedule table after change;

FIG. 20 is a diagram illustrating exemplary variables in a constraint satisfaction problem;

FIG. 28 is a diagram illustrating exemplary input data (part 2);

FIG. 29 is a diagram illustrating exemplary input data (part 3);

FIG. 34 is a diagram illustrating exemplary output data (part 2);

FIG. 38 is a diagram illustrating an exemplary maintenance schedule screen.

DESCRIPTION OF EMBODIMENTS

An information processing system is used to provide use environment of a virtual machine to a plurality of users. In this system, physical machine maintenance may occur. When performing maintenance, which may be accompanied with restart of a physical machine or the like, an operator migrates any virtual machine on the physical machine on which maintenance is performed to another physical machine in advance in some cases. However, the migration process may cause a performance degradation of the corresponding virtual machine or temporary interruption of the corresponding virtual machine operation. Thus, the operator may create the schedule of maintenance and the schedule of migration of the virtual machine along with the maintenance, and notify in advance the user thereof. For example, the migration schedule may be determined according to various constraints such as the performance of the physical machine, the placement status of the virtual machine on the physical machine, the required performance of the virtual machine, and the scheduled use of the virtual machine by each user.

On the other hand, in actual operation, there may be a request for a change to the initial migration schedule in accordance with a change in the use schedule of the virtual machine by the user. However, such a change in the migration schedule of the virtual machine may affect the determined migration schedule of the virtual machine used by another user. For this reason, it is not easy to change the initial migration schedule.

For example, it is also conceivable to adjust the schedule by performing a brute-force search for a time slot to be a candidate for scheduled migration so as to satisfy a time slot desired for change for the change target virtual machine while satisfying the constraints on the determined migration schedule for a virtual machine that is not subject to change. However, the larger the number of physical machines and virtual machines included in the system and the number of migration schedule change target virtual machines, the more the combinations of time slots to be examined, leading to longer time taken to adjust the schedule. There is no guarantee that there is a changed migration schedule that satisfies all the constraints, and it may not be possible to determine the changed migration schedule that satisfies all the constraints.

In one aspect, it is desirable to allow rescheduling with less impact on an existing migration schedule of a virtual machine.

The present embodiments will be described below with reference to the accompanying drawings.

[First Embodiment]

A first embodiment will be described.

Figure 1:
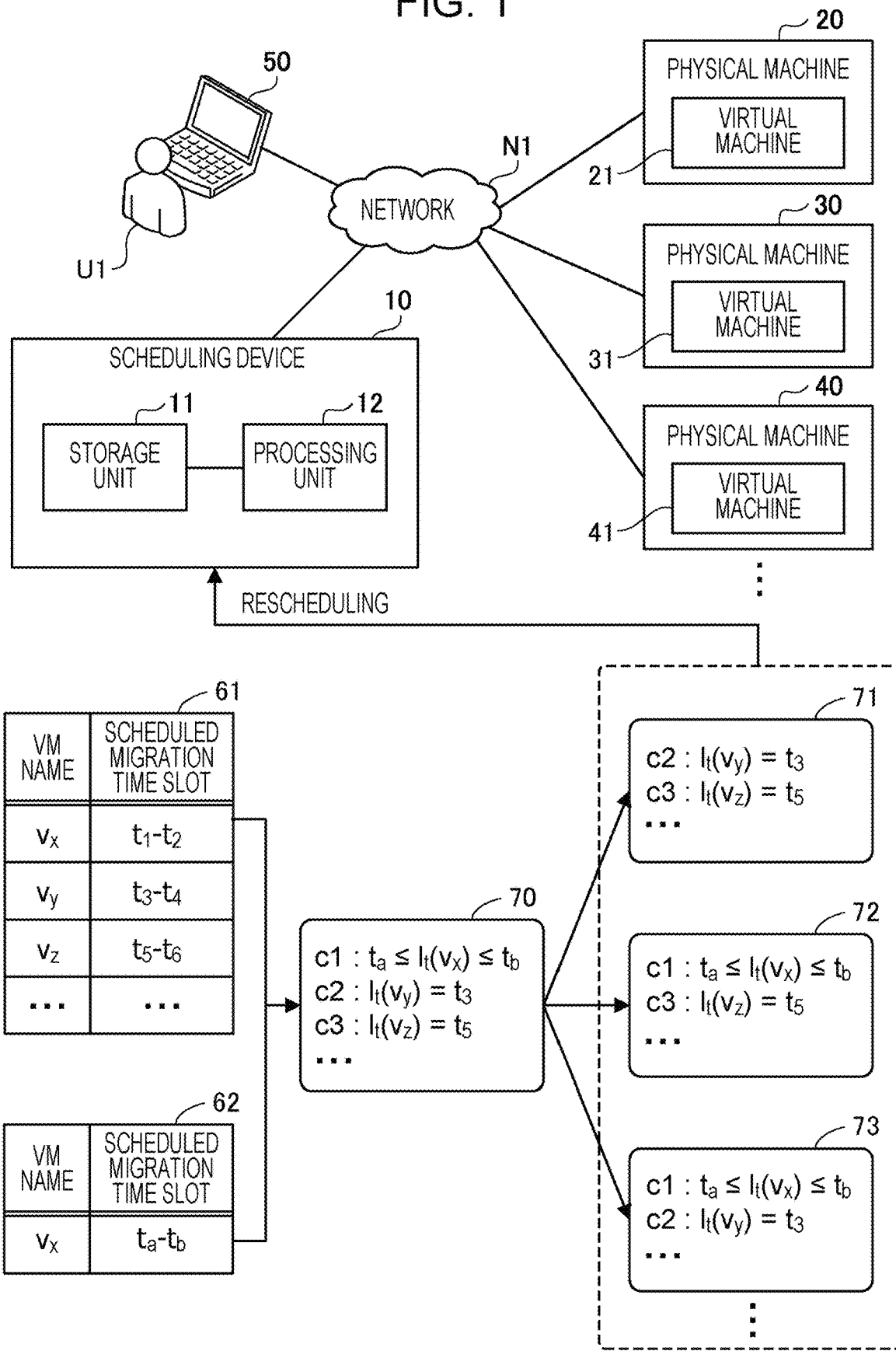
FIG. 1 is a diagram illustrating an exemplary information processing system according to a first embodiment.

FIG. 1 is a diagram illustrating an exemplary information processing system according to a first embodiment.

The information processing system according to the first embodiment includes a scheduling device 10 and physical machines 20, 30, 40, . . . . The scheduling device 10 and the physical machines 20, 30, 40, . . . are connected to a network N1. The scheduling device 10 adjusts a migration schedule of virtual machines on the physical machines 20, 30, 40, . . . .

The physical machines 20, 30, 40, . . . each include computation resources such as a CPU and a memory, and execute virtual machines by using the computation resources. For example, the physical machines 20, 30, 40, . . . each execute a hypervisor to allocate the computation resources to the virtual machines through the function of the hypervisor. For example, the physical machine 20 executes a virtual machine 21. The physical machine 30 executes a virtual machine 31. The physical machine 40 executes a virtual machine 41. The physical machines 20, 30, 40, . . . may execute two or more virtual machines, respectively. Each "virtual machine" is also abbreviated as "VM". The name (VM name) for identifying the virtual machine 21 is "$v_x$". The VM name of the virtual machine 31 is "$v_y$". The VM name of the virtual machine 41 is "$v_z$".

The network N1 is also connected to a terminal device 50. The terminal device 50 is a client used by a user U1 of the virtual machines. The terminal device 50 may be connected to the network N1 through another network such as the Internet.

The physical machines 20, 30, 40, . . . each have a function to migrate a virtual machine operating on the physical machine to another physical machine. For example, the physical machines 20, 30, 40, . . . each execute the virtual machine migration by using a technology called live migration. The live migration migrates a virtual machine while maintaining an startup state of the virtual machine by copying information of the CPU and memory resources of a physical machine as a migration source, which is allocated to the virtual machine to be migrated, to a physical machine as a migration destination. The virtual machine may be migrated by using an alternative technology of cold migration in which the virtual machine is stopped and then the corresponding information of the virtual machine is copied the physical machine as a migration destination.

In a system operation, maintenance such as security patch application and OS upgrade is executed on a physical machine as an infrastructure for achieving a virtual machine. In maintenance of a physical machine, the physical machine may be stopped. When the physical machine is stopped, any virtual machine on the physical machine is stopped and may not be used.

To avoid this, maintenance of a maintenance target physical machine may be performed after migrating any virtual machine on the maintenance target physical machine to any other physical machines 20, 30, 40, . . . before the maintenance of the physical machine. This may reduce the influence of the maintenance on the use of the virtual machine by the user. For this, the scheduling device 10 supports production of a virtual-machine migration schedule.

For example, the scheduling device 10 produces and holds the migration schedule according to various constraints (constraint conditions) such as the performance of the physical machine, the deployment status of the virtual machine on the physical machine, the required performance of the virtual machine, and the scheduled use of the virtual machine by each user. However, there are cases where it is desired to change the originally produced migration schedule according to the scheduled use of the virtual machine by the user, and the like. Therefore, the scheduling device 10 supports the change (rescheduling) of the originally produced migration schedule.

The scheduling device 10 includes a storage unit 11 and a processing unit 12.

The storage unit 11 may be a transitory storage device such as a RAM, or a non-transitory storage device such as a hard disk drive (HDD) or a flash memory. The processing unit 12 may include, for example, a CPU, a digital signal processor (DSP), an application specific integrated circuit (ASIC), and a field-programmable gate array (FPGA). The processing unit 12 may be a processor configured to execute a computer program. The processor may include a set (multiprocessor) of a plurality of processors.

The storage unit 11 stores an existing schedule 61. The existing schedule 61 is information indicating the produced migration schedule of the virtual machines 21, 31, 41, . . . associated with the maintenance of the physical machines 20, 30, 40, . . . . The existing schedule 61 indicates a time slot (or a period of time) for migrating a plurality of virtual machines between a plurality of physical machines. The existing schedule 61 is an unexecuted migration schedule scheduled after the present time, and does not include any executed migration schedule.

For example, as for the virtual machines 21, 31, 41, . . . , scheduled migration time slots for the virtual machine 21 having the VM name "$v_x$", the virtual machine 31 having the VM name "$v_y$", and the virtual machine 41 having the VM name "$v_z$" are registered in the existing schedule 61. In the existing schedule 61, scheduled migration time slots for other virtual machines are also registered, but the other virtual machines are abbreviated as ". . . ". The scheduled migration time slot of the virtual machine 21 is "$t_1$ to $t_2$" (time slot between time $t_1$ and time $t_2$). The scheduled migration time slot of the virtual machine 31 is "$t_3$ to $t_4$" (time slot between time $t_3$ and time $t_4$). The scheduled migration time slot of the virtual machine 41 is "$t_5$ to $t_6$" (time slot between time $t_5$ and time $t_6$).

The processing unit 12 acquires change information 62 related to a change in time slot of migration of a certain virtual machine for the existing schedule 61. There may be one or more virtual machines subject to change. For example, the change information 62 is inputted to the terminal device 50 by the user U1 and inputted to the scheduling device 10 by the terminal device 50 in accordance with a change in scheduled use of the virtual machine 21 by the user U1.

For example, for the VM name "$v_x$" of the virtual machine 21, the change information 62 indicates that the time slot (desired migration time slot) in which the user U1 wishes to migrate between the physical machines is "$t_a$ to $t_b$" (time slot between $t_a$ and $t_b$). The change information 62 may include a time slot in which migration is desired to be avoided (indicating that migration is desired in a time slot other than the avoidance time slot) instead of the desired migration time slot. The terminal device 50 transmits the inputted change information 62 to the scheduling device 10. The scheduling device 10 acquires the change information 62 by receiving the change information 62 transmitted by the terminal device 50. Alternatively, the change information 62 may be inputted to the scheduling device 10 by a system operator.

The processing unit 12 generates constraint information 70 including a constraint group corresponding to the change information 62 and the migration time slots of virtual machines other than the change target virtual machine in the existing schedule 61 (other virtual machines not to be changed). For example, the processing unit 12 generates a constraint c1 related to a desired migration time slot of the change target virtual machine 21 included in the change information 62. The constraint c1 is expressed as "$t_a \leq I_t(v_x) \leq t_b$". The variable $I_t(v)$ represents a migration execution start time of the virtual machine v. The processing unit 12 also generates constraints c2, c3, . . . related to respective scheduled migration time slots of the virtual machines 31, 41, . . . included in the existing schedule 61. For example, the constraint c2 is expressed as "$I_t(v_y)=t_3$". The constraint c3 is expressed as "$I_t(v_z)=t_5$".

The constraint information 70 may also include other constraints used to produce the existing schedule 61 (physical machine performance, current deployment status of virtual machines on the physical machines, desired performance of the virtual machines) in addition to the constraint group (constraints c1, c2, c3, . . .) corresponding to the migration time slot of the virtual machine. The constraint information 70 does not include any constraint on the scheduled migration time slot in the existing schedule 61 for the change target virtual machine (for example, the virtual machine 21).

The processing unit 12 generates a plurality of semi-constraint information in which the constraints included in the constraint group corresponding to the migration time slot of the virtual machine are excluded from the constraint information 70 one by one. For example, the processing unit 12 generates semi-constraint information 71, 72, 73, . . . based on the constraint information 70. The semi-constraint information 71 is obtained by excluding the constraint c1 from the constraint information 70. The semi-constraint information 72 is obtained by excluding the constraint c2 from the constraint information 70. The semi-constraint information 73 is obtained by excluding the constraint c3 from the constraint information 70. Likewise, the processing unit 12 generates other semi-constraint information by excluding the constraints corresponding to the migration time slot of the virtual machine from the constraint information 70 one by one.

The processing unit 12 generates rescheduling result information for each semi-constraint information by performing rescheduling of the migration of the plurality of virtual machines (virtual machines 21, 31, 41, . . . ) based on each of the generated plurality of semi-constraint information. For example, the processing unit 12 inputs the created semi-constraint information 71, 72, 73, . . . and information on the scheduled maintenance execution period (period after the current period) to a constraint satisfaction determination solver, and uses the function of the constraint satisfaction determination solver to create the rescheduling result. The rescheduling result is information indicating the adjusted schedule. For example, the processing unit 12 may use a mixed integer linear programming (MILP) solver, a satisfiability problem (SAT) solver, or the like as the constraint satisfaction determination solver. Hereinafter, the constraint satisfaction determination solver may be simply referred to as a solver. The processing unit 12 creates a plurality of rescheduling results for the plurality of semi-constraint information (one rescheduling result is created from one semi-constraint information by the solver function).

The processing unit 12 outputs a rescheduling result, among the plurality of rescheduling results, that reduces a difference in scheduled migration time of another virtual machine not subject to change between the rescheduling result and the existing schedule. For example, the processing unit 12 obtains a difference between the scheduled migration time of the virtual machine indicated by the rescheduling result and the scheduled migration time of the virtual machine indicated by the existing schedule 61 for each virtual machine excluding the constraint. The scheduled migration time of the virtual machine is, for example, the scheduled start time or the scheduled end time of the migration of the virtual machine. The time difference is obtained as a positive value. For example, the processing unit 12 selects a rescheduling result that minimizes the difference in scheduled migration time of the virtual machine.

The processing unit 12 outputs the selected rescheduling result. For example, the processing unit 12 may notify the user U1 of the rescheduling result by outputting the rescheduling result to the terminal device 50 and displaying the rescheduling result on a display device of the terminal device 50. Alternatively, the processing unit 12 may notify the operator of the rescheduling result by displaying the rescheduling result on a display device connected to the scheduling device 10.

This makes it possible to perform rescheduling with less influence on the existing migration schedule of the virtual machine. For example, the processing unit 12 may not be able to obtain a solution that satisfies the constraint information 70 to perform rescheduling. On the other hand, solving a satisfiable problem based on the semi-constraint information with the solver increases the possibility of acquiring a satisfiable solution (that is, an appropriate rescheduling result) even if rescheduling may not be performed with the constraint information 70.

However, the semi-constraint information excludes constraints on the existing scheduled migration time slot in any virtual machine. Therefore, in the rescheduling result obtained based on the semi-constraint information, there is a possibility that the existing scheduled migration time has been changed for the virtual machine not subject to change. Therefore, the processing unit 12 may reduce the influence on the scheduled migration of the virtual machine not subject to change by selecting a rescheduling result that reduces the difference from the existing scheduled migration time among the scheduled migration times indicated by the rescheduling result for each semi-constraint information.

It is conceivable that, when generating the semi-constraint information 71, 72, 73, . . . , the processing unit 12 selects constraints belonging to a minimal unsatisfiable (UNSAT) core for the migration time slot of each virtual machine as an exclusion target from the constraint information 70.

The unsatisfiable core (UNSAT core) is an unsatisfiable constraint subset existing in the constraint satisfaction problem when the given constraint satisfaction problem is unsatisfiable. For example, the minimal unsatisfiable core is an unsatisfiable core with minimality. For an unsatisfiable constraint satisfaction problem, removing any one of the minimal unsatisfiable cores turns the unsatisfiable constraint satisfaction problem into a satisfiable problem. The method described in the following document may be used for extraction of the minimal unsatisfiable core.

(Document 1) A. Nadel, "Boosting Minimal Unsatisfiable Core Extraction", in Proc. FMCAD'10, pp. 221-229, 2010.

As an example of a constraint set expressed by a logical operation, a constraint set having constraints a1, a2, and a3 expressed by Expression (1) is conceivable.

$$\begin{cases} a1: \ p \oplus q \\ a2: \ p \vee \bar{r} \\ a3: \ \overline{p \vee q} \end{cases} \tag{1}$$

p, q, and r are logical variables and take values of 0 or 1. The constraint a1 is an exclusive OR of p and q. The constraint a2 is a logical sum of p and negation of r. The constraint a3 is negation of the logical sum of p and q. There is no combination of p, q, and r values that makes all of the constraints a1, a2, and a3 true, and the constraint set is unsatisfiable. The minimal unsatisfiable cores of this constraint set are the constraints a1 and a3. In other words, the constraint set is set satisfiable by invalidating any one of the constraints a1 and a3 in the constraint set including the constraints a1, a2, and a3.

For example, the processing unit 12 may first try rescheduling by solving the constraint satisfaction problem based on the constraint information 70 using the solver. When having successfully acquired a solution that satisfies the constraint satisfaction problem, the processing unit 12 sets the acquired solution as a rescheduling result. On the other hand, when it is determined that the constraint satisfaction problem based on the constraint information 70 is unsatisfiable, the processing unit 12 may perform rescheduling by extracting a minimal unsatisfiable core for the virtual machine migration time slot from the constraint information 70 and generating the semi-constraint information 71, 72, 73, . . . .

The processing unit 12 may generate a plurality of semi-constraint information by excluding all constraints belonging to the minimal unsatisfiable core one by one, or by excluding some of the constraints belonging to the minimal unsatisfiable core one by one. In the latter method, rescheduling may be accelerated compared with the former method. In the latter case, priority for each virtual machine may be used to extract some of the constraints. For example, it is conceivable that priority for each virtual machine is determined according to the usage period and usage fee of the virtual machine, and constraints on virtual machines with low priority are preferentially excluded. For example, by increasing the priority of a virtual machine having a long use period or high use frequency and reducing the possibility of being excluded from the constraint, the influence on the use of the virtual machine by the user may be reduced.

In other words, the maintenance execution duration related to a physical machine inputted to the solver may be a candidate duration in which maintenance is performed on a physical machine as a maintenance target. For example, the processing unit 12 may further produce a constraint related to the maintenance execution duration of each physical machine based on information of a maintenance turnaround time for the physical machine (stored in the storage unit 11 in advance). Together with rescheduling of virtual machine migration, the processing unit 12 may determine, through the solver based on the constraints, a duration in which maintenance of each physical machine is performed in the candidate duration. The processing unit 12 performs rescheduling so that a virtual machine on a physical machine as a maintenance target is migrated to another physical machine before a duration in which maintenance of the physical machine is performed.

When outputting one of the plurality of rescheduling results, the processing unit 12 may also take into account a difference between the desired migration time slot and a new scheduled time slot of the change target virtual machine in addition to a difference between a new scheduled time and the existing scheduled time of the migration of the virtual machine not subject to change. The difference $\Delta T$ between the desired time slot $T_1$ to $T_2$ ($T_1 < T_2$) and the new scheduled time slot $T_3$ to $T_4$ ($T_3 < T_4$) is expressed as follows, for example. When $T_1 \leq T_3 < T_2$ and $T_1 < T_4 \leq T_2$, $\Delta T = 0$. When $T_3 < T_1$ and $T_4 \leq T_2$, $\Delta T = T_1 - T_3$. When $T_1 \leq T_3$ and $T_2 < T_4$, $\Delta T = T_4 - T_2$. When $T_3 < T_1$ and $T_2 < T_4$, $\Delta T = (T_1 - T_3) + (T_4 - T_2)$.

It is also conceivable, for example, that the processing unit 12 outputs a rescheduling result, among the plurality of rescheduling results, that reduces a first difference in scheduled migration time of the virtual machines 31, 41, ... between the rescheduling result and the existing schedule 61 or a second difference in migration time slot of the virtual machine 21 between the change information 62 and the rescheduling result. As an example, the processing unit 12 may select a rescheduling result that minimizes either one of the first difference and the second difference, and may output the selected rescheduling result. Alternatively, as another example, the processing unit 12 may select a rescheduling result that minimizes the sum of the first difference and the second difference. This makes it possible to improve the possibility of migration of the change target virtual machine in the desired migration time slot, and to reduce the influence on the existing scheduled migration time slots of the other virtual machines.

[Second Embodiment]

Next, a second embodiment will be described.

Figure 2:
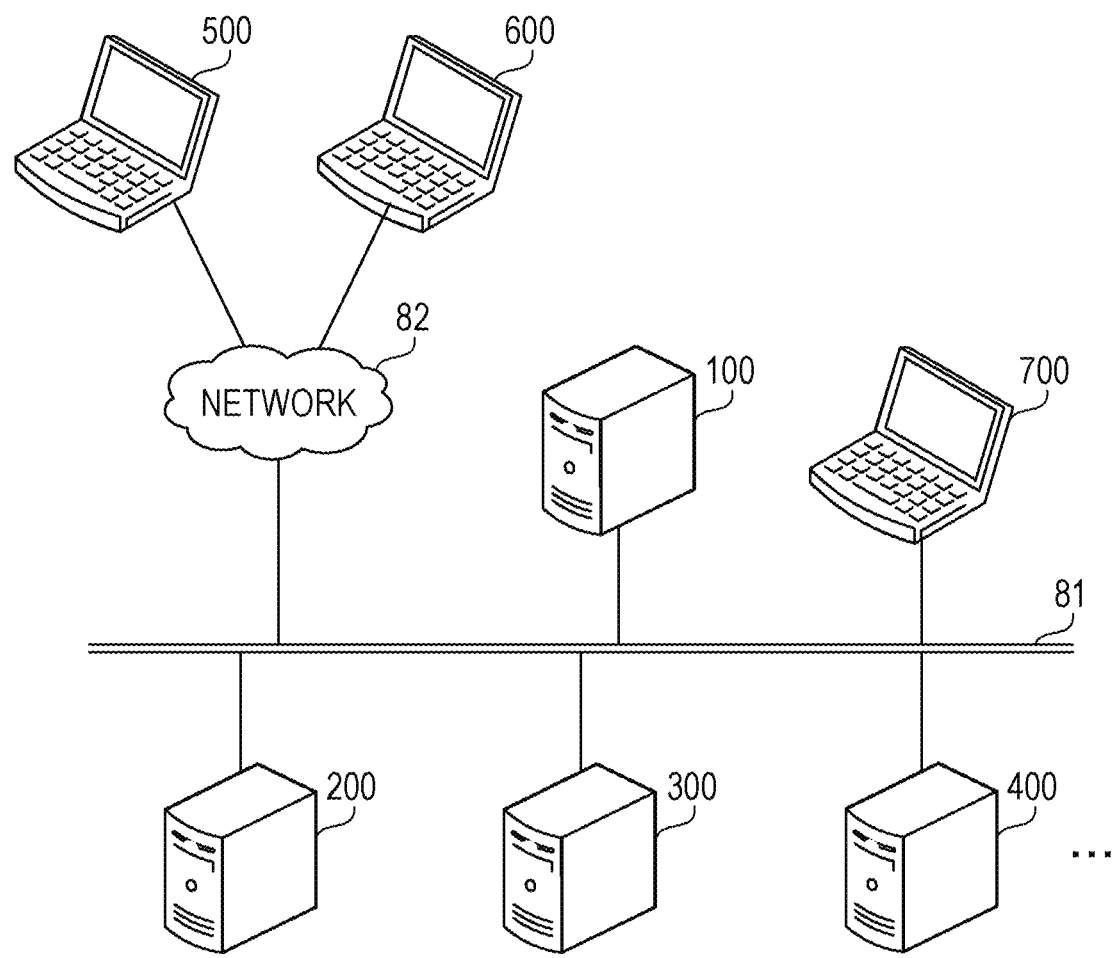
FIG. 2 is a diagram illustrating an exemplary information processing system according to a second embodiment.

FIG. 2 is a diagram illustrating an exemplary information processing system according to a second embodiment.

The information processing system according to the second embodiment includes a management server 100 and physical machines 200, 300, 400, . . . . The management server 100 and the physical machines 200, 300, 400, . . . are connected to a network 81. The network 81 is, for example, a local area network (LAN). The network 81 is connected to a network 82. The network 82 is a network outside of the network 81, such as the Internet or a wide area network (WAN). The network 82 is connected to user terminals 500 and 600. The network 81 is connected to an operator terminal 700.

The information processing system according to the second embodiment provides what is called cloud computing service. In the cloud computing service, an operator of the system provides hardware resources on the system to a plurality of users (tenants) through a network. The users of the system create virtual machines on the system by using the provided hardware resources, and run various kinds of work applications on the virtual machines.

In the information processing system according to the second embodiment, maintenance on an infrastructure (cloud base) side (for example, security patch application and OS upgrade at the physical machines 200, 300, 400, . . . ) is performed to maintain service quality. Before the maintenance is performed on a physical machine, processing of migrating any virtual machine operating on the physical machine to another physical machine is performed. After all the virtual machines on the physical machine are migrated, maintenance of the corresponding physical machine is performed. In an example described in the second embodiment, the live migration technology is used to migrate a virtual machine (however, the virtual machine migration may be achieved by cold migration).

The management server 100 is a server computer configured to manage a schedule of live migration of any virtual machine at the physical machines 200, 300, 400, . . . . Upon input of a physical machine as a maintenance target and a maintenance execution duration, the management server 100 produces a schedule of live migration of any virtual machine operating on the physical machine as a maintenance target. The management server 100 transmits the produced schedule to the user terminals 500 and 600 and the operator terminal 700. Upon confirmation of the produced schedule, the management server 100 instructs, in accordance with the confirmed schedule, the physical machine as a maintenance target to perform live migration of any virtual machine.

The management server 100 changes the initially created schedule according to a change in scheduled use of the virtual machine by the user. When the schedule is changed, the management server 100 transmits the changed schedule to the user terminals 500 and 600 and the operator terminal 700. Upon confirmation of the changed schedule, the management server 100 instructs, in accordance with the confirmed schedule after changed, the physical machine as a maintenance target to perform live migration of any virtual machine. The management server 100 is an exemplary scheduling device 10 according to the first embodiment.

The physical machines 200, 300, 400, . . . are server computers each including computation resources such as a CPU and a memory and configured to execute virtual machines by using the computation resources. For example, the physical machines 200, 300, 400, . . . each execute a hypervisor to allocate the computation resources to the virtual machines through the function of the hypervisor. The physical machines 200, 300, 400, . . . are exemplary physical machines 20, 30, 40, . . . according to the first embodiment.

The user terminals 500 and 600 are client computers used by users. The user terminals 500 and 600 are used by different users. The users use virtual machines on the physical machines 200, 300, 400, . . . by operating the respective user terminals 500 and 600. The user of the user terminal 500 may check, by using the user terminal 500, a schedule of live migration (live migration of a virtual machine used by the user), which is provided by the management server 100. Similarly, the user of the user terminal 600 may check a live migration schedule provided by the management server 100 by using the user terminal 600. The user terminals 500 and 600 are exemplary terminal devices 50 according to the first embodiment.

The operator terminal 700 is a client computer used by an operator (system administrator) of the information processing system according to the second embodiment. The operator uses the operator terminal 700 to check a physical-machine maintenance schedule provided by the management server 100 and a schedule of live migration along with maintenance.

Figure 3:
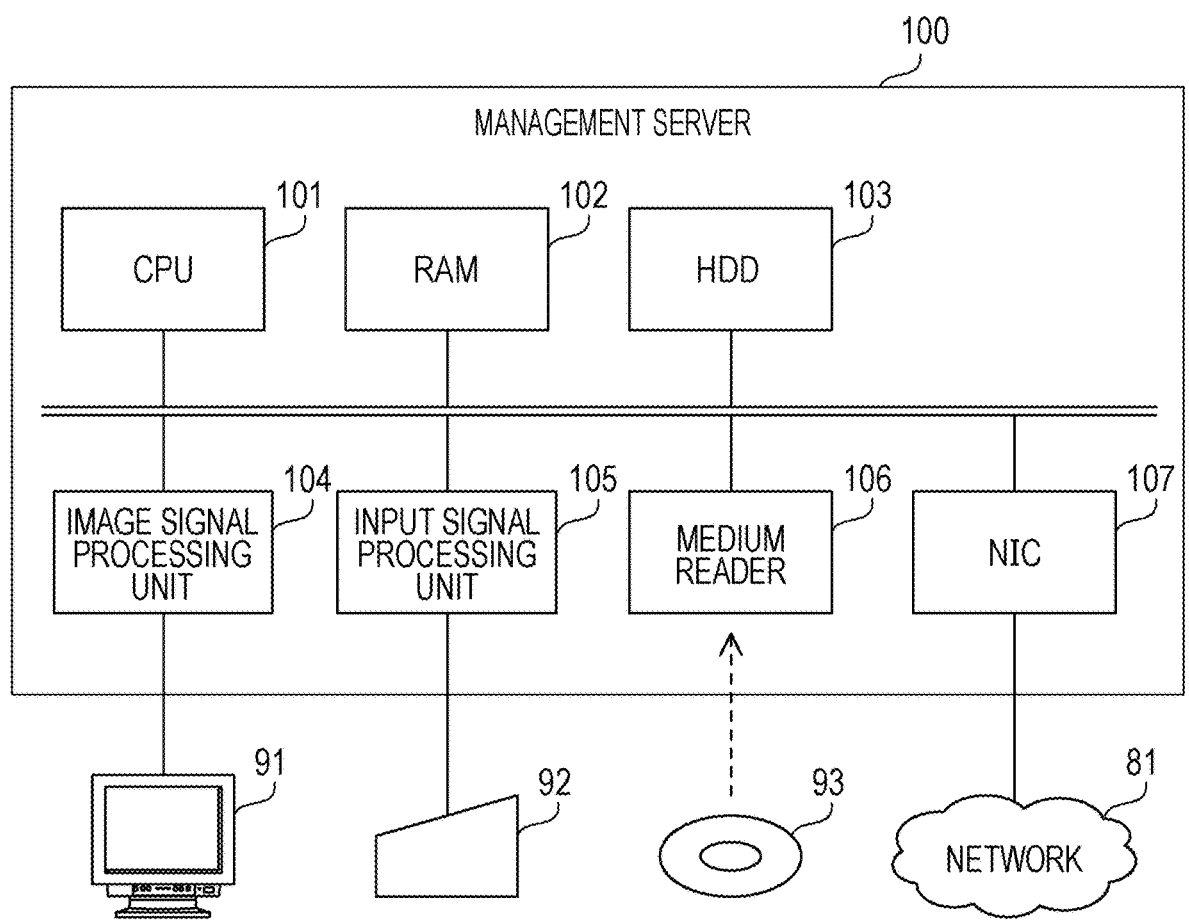
FIG. 3 is a block diagram illustrating exemplary hardware of a management server.

FIG. 3 is a diagram illustrating exemplary hardware of the management server.

The management server 100 includes a CPU 101, a RAM 102, an HDD 103, an image signal processing unit 104, an input signal processing unit 105, a medium reader 106, and a network interface card (NIC) 107. The CPU 101 corresponds to the processing unit 12 of the first embodiment. The RAM 102 or HDD 103 corresponds to the storage unit 11 of the first embodiment.

The CPU 101 is a processor that executes program instructions. The CPU 101 loads at least a part of the program and data stored in the HDD 103 into the RAM 102 and executes the program. The CPU 101 may include a plurality of processor cores. The management server 100 may have a plurality of processors. The processes described below may be executed in parallel using a plurality of processors or processor cores. A set of processors may be referred to as "multiprocessor" or simply "processor".

The RAM 102 is a volatile semiconductor memory that temporarily stores programs executed by the CPU 101 and data used by the CPU 101 for calculations. The management server 100 may include a type of memory other than the RAM, or may include a plurality of memories.

The HDD 103 is a nonvolatile storage device that stores software programs such as an OS, middleware, and application software, and data. The management server 100 may include a storage device of another kind such as a flash memory or a solid state drive (SSD), and may include a plurality of nonvolatile storage devices.

The image signal processing unit 104 outputs an image to a display 91 coupled to the management server 100 in accordance with a command from the CPU 101. As the display 91, any kind of display may be used, such as a cathode ray tube (CRT) display, a liquid crystal display (LCD), a plasma display, an organic electro-luminescence (OEL) display, or the like.

The input signal processing unit 105 acquires an input signal from an input device 92 connected to the management server 100, and outputs the input signal to the CPU 101. As the input device 92, a pointing device such as a mouse, a touch panel, a touch pad, a trackball, a keyboard, a remote controller, a button switch, or the like may be used. A plurality of types of input devices may be connected to the management server 100.

The medium reader 106 is a device configured to read programs and data recorded in a recording medium 93. As the recording medium 93, for example, a magnetic disk, an optical disk, a magneto-optical disk (MO), a semiconductor memory, or the like may be used. The magnetic disk includes a flexible disk (FD) and an HDD. The optical disc includes a compact disc (CD) and a digital versatile disc (DVD).

For example, the medium reader 106 copies a program or data read from the recording medium 93 to another recording medium such as the RAM 102 or the HDD 103. The read program is executed by the CPU 101, for example. The recording medium 93 may be a portable recording medium and may be used for distributing programs and data. The recording medium 93 and the HDD 103 may be referred to as computer-readable recording media.

The NIC 107 is an interface that is connected to the network 81 and communicates with other computers via the network 81. For example, the NIC 107 is connected to a communication device such as a switch or a router belonging to the network 81 with a cable.

The physical machines 200, 300, 400, . . . , the user terminals 500 and 600, and the operator terminal 700 may be achieved by using hardware components similarly to those of the management server 100.

Figure 4:
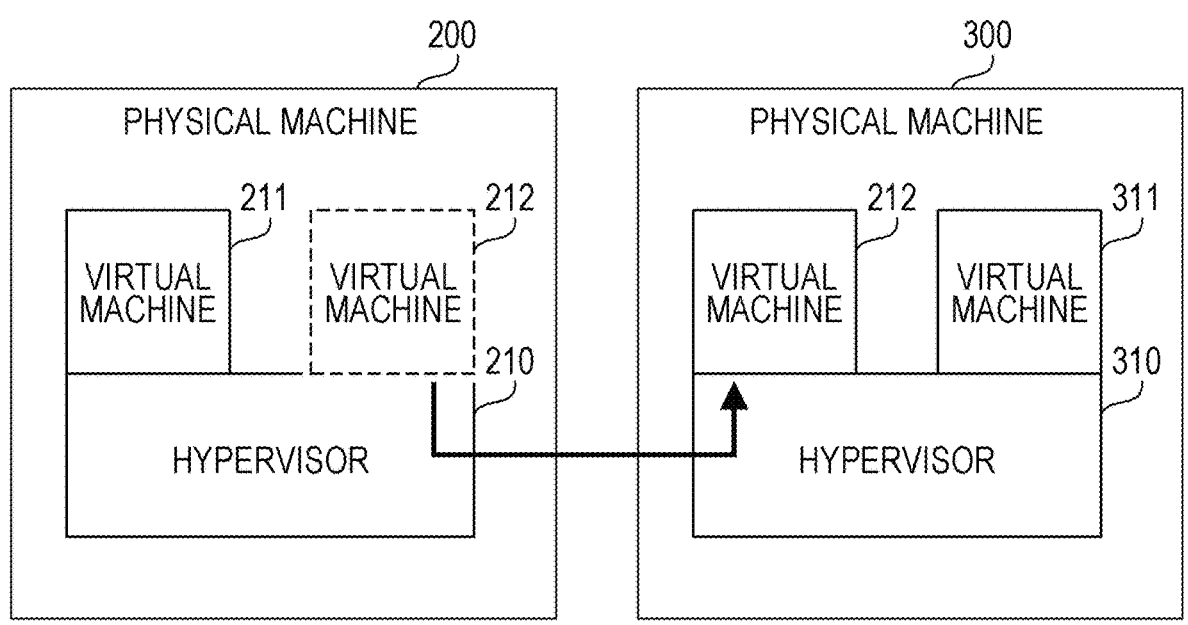
FIG. 4 is a diagram illustrating exemplary live migration.

FIG. 4 is a diagram illustrating exemplary live migration.

The physical machines 200, 300, 400, . . . migrate a virtual machine between physical machines by the live migration. For example, the physical machine 200 includes a hypervisor 210 and virtual machines 211 and 212. The physical machine 300 includes a hypervisor 310 and a virtual machine 311. The hypervisor 210 allocates hardware resources such as a CPU and a memory included in the physical machine 200 to the virtual machines 211 and 212. Similarly, the hypervisor 310 allocates hardware resources included in the physical machine 300 to the virtual machine 311. For example, when the virtual machine 212 is migrated from the physical machine 200 to the physical machine 300, the following procedure is executed during live migration.

(1) CPU and memory resources for the virtual machine 212 as a migration target are reserved on the physical machine 300. (2) Data of a memory resource allocated to the virtual machine 212 as a migration target on the physical machine 200 is copied to a memory resource newly allocated to the virtual machine 212 on the physical machine 300. (3) The state of a CPU resource allocated to the virtual machine 212 is copied from the physical machine 200 to the physical machine 300, and the virtual machine 212 on the physical machine 200 is suspended. (4) The virtual machine 212 is resumed on the physical machine 300, and any resource allocated to the virtual machine 212 on the physical machine 200 is released. Accordingly, the virtual machine 212 operating on the physical machine 200 is migrated to the physical machine 300. The above-described procedure is also called Pre-Copy. However, another procedure such as Post-Copy may be used for live migration.

In the following description, live migration is also abbreviated as an LM.

Figure 5:
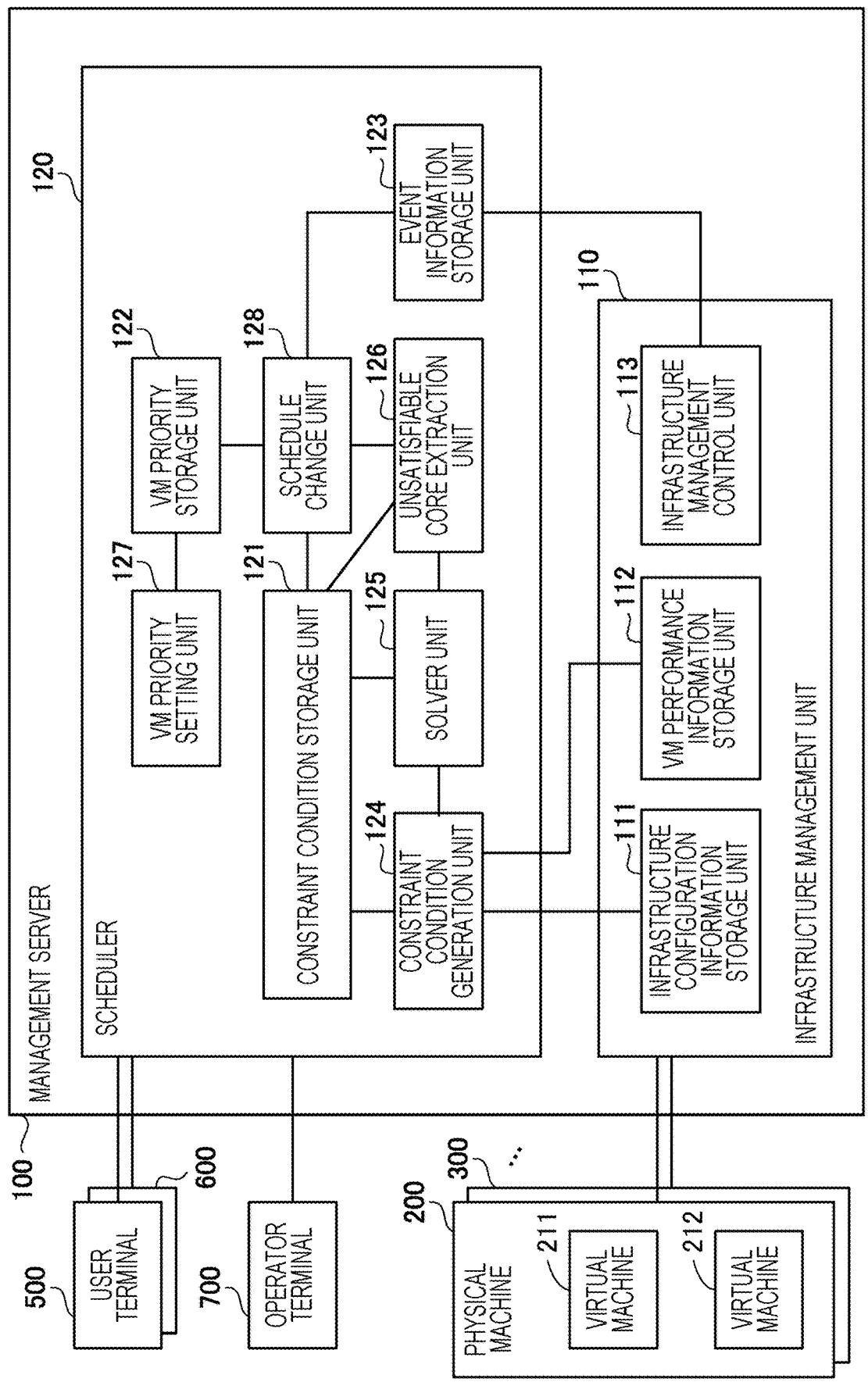
FIG. 5 is a diagram illustrating an exemplary function of the management server.

FIG. 5 is a diagram illustrating an exemplary function of the management server.

The management server 100 includes an infrastructure management unit 110 and a scheduler 120. Functions of the infrastructure management unit 110 and the scheduler 120 are achieved by the CPU 101. For example, the CPU 101 achieves the functions of the infrastructure management unit 110 and the scheduler 120 by executing scheduling programs stored in the RAM 102. The infrastructure management unit 110 and the scheduler 120 may be implemented by hardware such as an FPGA or an ASIC.

The infrastructure management unit 110 manages the hardware configuration of each physical machine and the configuration of resources allocated to each virtual machine. The infrastructure management unit 110 includes an infrastructure configuration information storage unit 111, a VM performance information storage unit 112, and an infrastructure management control unit 113. The infrastructure configuration information storage unit 111 and the VM performance information storage unit 112 are achieved by using, for example, storage regions of the RAM 102 and the HDD 103.

The infrastructure configuration information storage unit 111 stores infrastructure configuration information. The infrastructure configuration information is information related to the hardware configuration of each physical machine and the configuration of resources allocated to each virtual machine. The infrastructure configuration information includes information related to LM turnaround time of each virtual machine.

The VM performance information storage unit 112 stores VM performance information. The VM performance information also includes, for example, a history of a load on each virtual machine (history of a load on each virtual machine at each past time) used to obtain an LM turnaround time prediction result. LM turnaround time prediction based on the history of a load on each virtual machine may be performed by the management server 100.

The infrastructure management control unit 113 instructs virtual-machine LM to each physical machine in accordance with an LM schedule determined by the scheduler 120.

When physical-machine maintenance is to be performed, the scheduler 120 determines a schedule of LM of any virtual machine operating on a physical machine as a maintenance target. When having received a maintenance execution duration and information of the physical machine as a maintenance target from the operator terminal 700, the scheduler 120 determines an LM schedule based on information stored in the infrastructure configuration information storage unit 111 and the VM performance information storage unit 112.

The scheduler 120 may accept a change to the LM schedule after determination. For example, the scheduler 120 accepts requests, from the user terminals 500 and 600, on the LM execution time slot different from the initially determined schedule for the virtual machine according to the change in scheduled use of the virtual machine by the user. Then, the scheduler 120 changes the initially determined LM schedule. This schedule change may affect the LM schedule of virtual machines other than the virtual machine requested to be changed.

The scheduler 120 includes a constraint condition storage unit 121, a VM priority storage unit 122, an event information storage unit 123, a constraint condition generation unit 124, a solver unit 125, an unsatisfiable core extraction unit 126, a VM priority setting unit 127, and a schedule change unit 128. The constraint condition storage unit 121, the VM priority storage unit 122, and the event information storage unit 123 are implemented using, for example, storage areas of the RAM 102 and the HDD 103.

The constraint condition storage unit 121 stores a constraint condition generated by the constraint condition generation unit 124.

The VM priority storage unit 122 stores the priority for each virtual machine. The priority for each virtual machine is used to select a constraint condition to be excluded during rescheduling.

The event information storage unit 123 stores information of an LM schedule of each virtual machine, which is produced by the solver unit 125, and information of a maintenance schedule of each physical machine. The event information storage unit 123 stores information of a changed LM schedule of each virtual machine, which is produced by the schedule change unit 128, and information of a changed maintenance schedule of each physical machine.

The constraint condition generation unit 124 generates a constraint condition on LM schedule determination based on the infrastructure configuration information stored in the infrastructure configuration information storage unit 111. The constraint condition generation unit 124 may further use VM performance information stored in the VM performance information storage unit 112 to generate a constraint condition on LM schedule determination. For example, for each virtual machine, it is conceivable that the constraint condition is to achieve LM with priority given to a time slot when the load of the virtual machine is low. The constraint condition generation unit 124 stores the generated constraint condition in the constraint condition storage unit 121.

In the case of rescheduling, the constraint condition generation unit 124 also generates a constraint condition related to the LM execution time slot request inputted from the user terminals 500 and 600. In the case of rescheduling, the constraint condition generation unit 124 also generates a constraint condition corresponding to the existing schedule based on the existing schedule information stored in the event information storage unit 123.

The solver unit 125 tests LM schedule production by determining whether it is possible to perform scheduling so that the constraint condition generated by the constraint condition generation unit 124 is satisfied. The solver unit 125 stores, in the event information storage unit 123, the best LM schedules that satisfy the generated constraint condition. The solver unit 125 may be an MILP solver or a SAT solver.

In the case of rescheduling, again, the solver unit 125 generates an LM schedule that best satisfies the constraint condition generated by the constraint condition generation unit 124 and stores the generated LM schedule in the event information storage unit 123. During the rescheduling, the solver unit 125 may not be able to generate an LM schedule that satisfies all the constraint conditions generated by the constraint condition generation unit 124.

When the solver unit 125 is unable to generate the LM schedule during rescheduling, the unsatisfiable core extraction unit 126 extracts a minimal unsatisfiable core from the constraint condition related to the LM execution time slot among all the constraint conditions used for rescheduling. The unsatisfiable core extraction unit 126 provides the extracted minimal unsatisfiable core to the schedule change unit 128.

The VM priority setting unit 127 determines the priority for each virtual machine and stores the priority in the VM priority storage unit 122. For example, the VM priority setting unit 127 determines the priority for each virtual machine based on the usage status of the virtual machine by the user.

Based on the minimal unsatisfiable core and the priority for each virtual machine stored in the VM priority storage unit 122, the schedule change unit 128 determines the constraint conditions to be excluded from all the constraint conditions used for rescheduling. Then, the schedule change unit 128 generates a plurality of semi-constraint satisfaction problems by excluding the constraint conditions to be excluded one by one from all the constraint conditions.

Based on each of the generated semi-constraint satisfaction problems, the schedule change unit 128 generates an LM rescheduling result that best satisfies the semi-constraint satisfaction problem, as in the case of the solver unit 125. Then, the schedule change unit 128 selects one rescheduling result from among the plurality of rescheduling results, based on a predetermined objective function. For example, the objective function is a function that represents a difference between the desired time slot of the virtual machine for which the LM time slot is desired to be changed and the changed time slot, and a difference between the existing LM scheduled time of the other virtual machines and the changed LM scheduled time. In this case, the schedule change unit 128 selects a rescheduling result that minimizes the objective function, and stores it in the event information storage unit 123 as the changed schedule information.

Next, a minimal unsatisfiable core will be described.

Figures 6, 7:
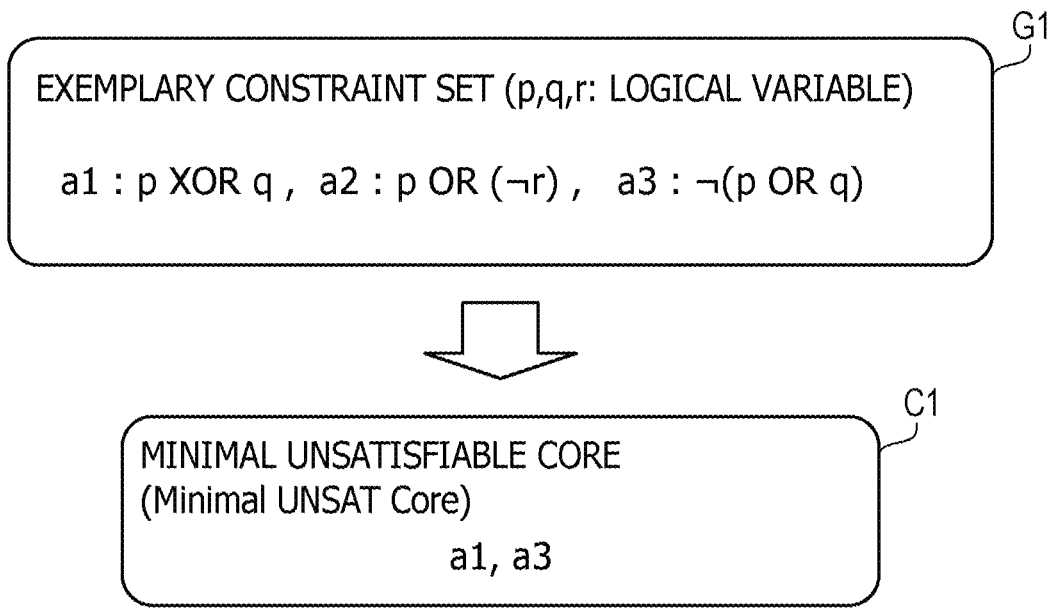
FIG. 6 is a diagram illustrating an exemplary minimal unsatisfiable core for a constraint set.
FIG. 7 is a diagram illustrating exemplary maintenance execution duration information.

FIG. 6 is a diagram illustrating an exemplary minimal unsatisfiable core for a constraint set.

For example, a constraint set G1 represented by a logical operation is considered. The constraint set G1 includes constraint conditions a1, a2, and a3. The constraint conditions a1, a2, and a3 include logical variables p, q, and r. The values of the logical variables p, q, and r are 0 or 1.

The constraint condition a1 is "p XOR q". The constraint condition a2 is "p OR (]r)". "]x" represents negation of x. The constraint condition a3 is "](p $^{OR}$ q)".

There is no set of p, q, and r that makes all the constraint conditions a1, a2, and a3 true. Therefore, the constraint set G1 is unsatisfiable. In this case, the minimal unsatisfiable core C1 may be extracted from the constraint set G1. In the example of the constraint set G1, the minimal unsatisfiable core C1 is the pair of the constraint conditions a1 and a3. For example, a constraint set (a set of the constraint conditions a1 and a2 or a set of the constraint conditions a2 and a3) in which any one of the constraint conditions a1 and a3 is invalidated in the constraint set G1 is satisfiable.

For example, the unsatisfiable core extraction unit 126 extracts the pair of the constraint conditions a1 and a3 as the minimal unsatisfiable core C1 for the constraint set G1. For the extraction of the minimal unsatisfiable core, the method described in the above-mentioned document 1 "Boosting Minimal Unsatisfiable Core Extraction" may be used.

FIG. 7 is a diagram illustrating exemplary maintenance execution duration information.

Maintenance execution duration information 131 is input to the scheduler 120 by the operator terminal 700. The maintenance execution duration information 131 is information of maintenance execution durations related to a plurality of physical machines included in the system. The maintenance execution duration information 131 includes the item of start date and time and the item of end date and time.

The start date and time of a maintenance execution duration is registered to the item of start date and time. The end date and time of a maintenance execution duration is registered to the item of end date and time. For example, the maintenance execution duration information 131 includes information such as the start date and time of "2018-06-01T12:00:00.000Z" and the end date and time of "2018-06-30T11:59:00.000Z". This indicates that the maintenance execution duration extends from 12:00 on Jun. 1, 2018 to 11:59 on Jun. 30, 2018. In the case of rescheduling, the time to start rescheduling is the start date and time of the maintenance execution duration.

Maintenance work on one physical machine is performed by using a time range in part of a maintenance execution duration. The management server 100 performs scheduling so that maintenance work on each physical machine is completed during an input maintenance execution duration.

For example, before maintenance work is performed on a first physical machine, the management server 100 migrates all virtual machines on the first physical machine to a second physical machine (the migration destination may be a plurality of physical machines) so that maintenance work is performed on the first physical machine.

Thereafter, maintenance work is performed on the second physical machine in some case. In such a case, the management server 100 migrates all virtual machines on the second physical machine to the first physical machine or a third physical machine (the migration destination may be a plurality of physical machines) so that maintenance work is performed on the second physical machine.

FIG. 8 is a diagram illustrating exemplary maintenance target machine information.

Maintenance target machine information 132 is input to the scheduler 120 by the operator terminal 700. The maintenance target machine information 132 includes the item of physical machine name and the item of maintenance turnaround time.

The name of a physical machine is registered to the item of physical machine name. A turnaround time for maintenance work of the physical machine is registered to the item of maintenance turnaround time. For example, the maintenance target machine information 132 includes information such as the physical machine name "PM01" ("PM" stands for physical machine) and the maintenance turnaround time of "01:00:00.000". This indicates that a turnaround time for maintenance work on a physical machine indicated by the physical machine name "PM01" is one hour.

Similarly, the maintenance target machine information 132 registers a physical machine name and a maintenance turnaround time for another physical machine as a maintenance target.

FIG. 9 is a diagram illustrating an exemplary physical machine configuration table.

A physical machine configuration table 141 is stored in the infrastructure configuration information storage unit 111 in advance. The physical machine configuration table 141 includes the item of physical machine name, the item of the number of CPU cores, the item of memory capacity, and the item of disk capacity.

The name of a physical machine is registered to the item of physical machine name. The number of CPU cores included in the physical machine is registered to the item of the number of CPU cores. The capacity of a memory (RAM) included in the physical machine is registered to the item of memory capacity. The capacity of an HDD included in the physical machine (or an auxiliary storage region allocated to an external storage for the physical machine) is registered to the item of disk capacity.

For example, the physical machine configuration table 141 registers a record with the physical machine name "PM01", the number of CPU cores of "64", the memory capacity of "256 GB", and the disk capacity of "32 TB". This record indicates that the number of CPU cores included in a physical machine indicated by the physical machine name "PM01" is 64, the memory capacity of the physical machine is 256 GB, and the disk capacity thereof is 32 TB.

Similarly, the physical machine configuration table 141 registers a physical machine name, the number of CPU cores, a memory capacity, and a disk capacity for another physical machine.

FIG. 10 is a diagram illustrating an exemplary virtual machine configuration table.

A virtual machine configuration table 142 is stored in the infrastructure configuration information storage unit 111 in advance. The virtual machine configuration table 142 includes the item of virtual machine name, the item of user identifier (ID), the item of the number of CPU cores, the item of memory capacity, the item of disk capacity, and the item of LM turnaround time.

The name of a virtual machine is registered to the item of virtual machine name. The user ID of a user using the virtual machine is registered to the item of user ID. The number of CPU cores allocated to the virtual machine is registered to the item of the number of CPU cores. The capacity of a memory allocated to the virtual machine is registered to the item of memory capacity. The capacity of an HDD (or an auxiliary storage device of an external storage of the physical machine) allocated to the virtual machine is registered to the item of disk capacity. The LM turnaround time of the virtual machine is registered to the item of LM turnaround time.

For example, the virtual machine configuration table 142 registers a record with the virtual machine name "accounting-db-13", the user ID of "user1", the number of CPU cores of "2", the memory capacity of "32 GB", the disk capacity of "2 TB", and the LM turnaround time of "25 minutes". This record indicates that the virtual machine with the virtual machine name "accounting-db-13" is used by the user with the user ID "user1". The record also indicates that the number of CPU cores required for the virtual machine is 2, the memory capacity is 32 GB, the disk capacity is 2 TB, and the LM turnaround time is 25 minutes.

Similarly, the virtual machine configuration table 142 registers a virtual machine name, the number of CPU cores, a memory capacity, a disk capacity, a user ID, and an LM turnaround time for another virtual machine.

FIG. 11 is a diagram illustrating an exemplary virtual machine operation table.

A virtual machine operation table 143 is stored in the infrastructure configuration information storage unit 111 in advance. The virtual machine operation table 143 is information indicating a physical machine as an initial deployment target of each virtual machine. In the case of rescheduling, the initial deployment location of each virtual machine is the deployment location of each virtual machine at the start date and time of the rescheduling target period. The virtual machine operation table 143 includes the item of a physical machine name, the item of a virtual machine name, and the item of a user ID.

The name of a physical machine is registered to the item of physical machine name. The name of a virtual machine operating on the physical machine is registered to the item of virtual machine name. The user ID of a user using the virtual machine is registered to the item of user ID.

For example, the virtual machine operation table 143 registers a record with the physical machine name "PM01", the virtual machine name "server-90", and the user ID of "user3". This record indicates that a virtual machine indicated by the virtual machine name "server-90" operates on a physical machine indicated by the physical machine name "PM01", and this virtual machine is used by a user with the user ID of "user3".

Similarly, the virtual machine operation table 143 registers the name of a physical machine as a deployment target, a virtual machine name, and a user ID for another virtual machine.

FIG. 12 is a diagram illustrating an exemplary dependency relation table.

A dependency relation table 144 is stored in the infrastructure configuration information storage unit 111 in advance. The dependency relation table 144 is information indicating a dependency relation in a group of virtual machines. The dependency relation table 144 includes the item of group name, the item of virtual machine name, and the item of rule.

The name of a group of virtual machines is registered to the item of group name. A set of the names of virtual machines belonging to the group is registered to the item of virtual machine name. Information indicating whether the virtual machines belonging to the group are to be operated on an identical physical machine is registered to the item of rule. For example, the rule of "affinity" indicates operation on an identical physical machine (referred to as an affinity rule). For example, the rule of "anti-affinity" indicates non-operation on an identical physical machine (referred to as an anti-affinity rule).

For example, the dependency relation table 144 registers a record with a group name "G01", virtual machine names "accounting-db-13" and "accounting-db-03", and a rule "anti-affinity". This record indicates that two virtual machines having the virtual machine names of "accounting-db-13" and "accounting-db-03" belong to a group indicated by the group name of "G01" and are not to be operated on an identical physical machine.

For example, the dependency relation table 144 registers a record with a group name "G02", virtual machine names "accounting-db-03" and "accounting-web-03", and a rule "affinity". This record indicates that two virtual machines having the virtual machine names of "accounting-db-03" and "accounting-web-03" belong to a group indicated by the group name of "G02" are to be operated on an identical physical machine.

Similarly, the dependency relation table 144 registers a group name, a virtual machine name, and a rule for another group of virtual machines.

FIG. 13 is a diagram illustrating exemplary minimal unsatisfiable core information.

The minimal unsatisfiable core information 145 is generated by the unsatisfiable core extraction unit 126 and stored in the constraint condition storage unit 121. The unsatisfiable core extraction unit 126 includes the item of virtual machine name. In the virtual machine name item, the name of the virtual machine corresponding to the constraint condition belonging to the minimal unsatisfiable core is registered.

For example, information such as virtual machine names "vm-67", "server-90", "accounting-web-03", . . . is registered in the unsatisfiable core extraction unit 126. This indicates that the constraint condition after the exclusion may be satisfied by excluding the constraint condition on the LM execution time slot for any one of the virtual machines having the virtual machine names "vm-67", "server-90", "accounting-web-03", . . . in the unsatisfiable constraint set used for rescheduling. When the virtual machine to be excluded is a virtual machine that has been requested for change in LM execution time slot, the "constraint condition on the LM execution time slot" is the requested execution time slot (or requested execution avoidance time slot). When the virtual machine to be excluded is a virtual machine that is not the target of the change request, the "constraint condition on the LM execution time slot" is the time slot of the scheduled LM execution in the existing schedule.

FIG. 14 is a diagram illustrating an exemplary priority table.

The priority table 146 is generated by the VM priority setting unit 127 and stored in the VM priority storage unit 122. The priority table 146 includes the item of virtual machine name and the item of priority.

The name of a virtual machine is registered to the item of virtual machine name. The priority of the virtual machine is registered to the item of priority. The priority is represented by a numerical value; the smaller the numerical value, the higher the priority.

For example, the priority table 146 registers a record with a virtual machine name "accounting-db-13" and the priority "22". This record indicates that the priority of the virtual machine with the virtual machine name "accounting-db-13" is "22" (the 22nd highest priority among all the LM target virtual machines).

Similarly, the priority table 146 registers priorities for other virtual machines.

Next, exemplary determination of the priority for each virtual machine by the VM priority setting unit 127 will be described.

FIG. 15 is a diagram illustrating exemplary priority determination.

The VM priority setting unit 127 sets the priority based on the usage information 146a of each virtual machine. For example, the usage information 146a includes a virtual machine name, a usage status of the virtual machine, and a scheduled LM execution time. The usage status of the virtual machine includes a usage fee of each virtual machine and a period (use period) of use by the user. The VM priority setting unit 127 increases the priority of the virtual machine as the usage fee is higher. The VM priority setting unit 127 increases the priority of the virtual machine as the usage period is longer. The scheduled LM execution time is the existing scheduled LM execution time of each virtual machine. The VM priority setting unit 127 increases the priority of the virtual machine as the scheduled LM execution time is closer to the execution date and time of rescheduling. This is because if the most recent schedule is changed, the influence on the scheduled use of the virtual machine by the user is increased.

In the exemplary usage information 146a, the VM priority setting unit 127 sets the virtual machine having the virtual machine name "server-42" to the priority "1" (highest priority). The VM priority setting unit 127 sets the virtual machine having the virtual machine name "mysql-101" to the priority "2". The VM priority setting unit 127 sets the virtual machine having the virtual machine name "web-db-251" to the priority "3". Similarly, priorities are set for other virtual machines according to the usage status and scheduled LM execution time.

FIG. 16 is a diagram illustrating an exemplary maintenance schedule table (before change).

A maintenance schedule table 151 is generated by the solver unit 125 and stored in the event information storage unit 123. The maintenance schedule table 151 is a schedule initially created by the solver unit 125, and is information before a schedule change due to a user's request or the like. The maintenance schedule table 151 includes the item of physical machine name, the item of start date and time, and the item of end date and time.

The name of a physical machine as a maintenance target is registered to the item of physical machine name. The start date and time of maintenance of the physical machine is registered to the item of start date and time. The end date and time of maintenance of the physical machine is registered to the item of end date and time.

For example, the maintenance schedule table 151 registers a record with the physical machine name "PM01", the start date and time of "2018-06-20T11:30:00.000Z", and the end date and time of "2018-06-20T12:29:00.000Z". This record indicates that maintenance of a physical machine having the physical machine name "PM01" is scheduled to be performed between 11:30 and 12:29 on Jun. 20, 2018.

Similarly, the maintenance schedule table 151 registers a physical machine name, start date and time, and end date and time for another physical machine as a maintenance target.

FIG. 17 is a diagram illustrating an exemplary LM schedule table (before change).

An LM schedule table 152 is generated by the solver unit 125 and stored in the event information storage unit 123. The LM schedule table 152 is a schedule initially created by the solver unit 125, and is information before a schedule change due to a user's request or the like. The LM schedule table 152 includes the item of virtual machine name, the item of start date and time, the item of end date and time, the item of migration source, and the item of migration destination.

The name of a virtual machine as an LM target is registered to the item of virtual machine name. The start date and time of LM of the virtual machine is registered to the item of start date and time. The end date and time of LM of the virtual machine is registered to the item of end date and time. The name (physical machine name) of a physical machine as an LM migration source is registered to the item of migration source. The name (physical machine name) of a physical machine as an LM migration destination is registered to the item of migration destination.

For example, the LM schedule table 152 registers a record with the virtual machine name "server-90", the start date and time of "2018-06-20T09:45:00.000Z", the end date and time of "2018-06-20T09:59:00.000Z", the migration source of "PM01", and the migration destination of "PM02".

This record indicates that LM of the virtual machine name "server-90" starts at 9:45 on Jun. 20, 2018 and ends at 9:59 on Jun. 20, 2018. This record also indicates that the migration source of the LM is the physical machine with the physical machine name "PM01" and the migration destination is the physical machine with the physical machine name "PM02".

The LM schedule table 152 also registers a virtual machine name, start date and time, end date and time, a migration source, and a migration destination for another virtual machine.

The contents of the item of virtual machine name, the item of start date and time, and the item of end date and time in the LM schedule table 152 are presented to the user. The contents of the item of virtual machine name, the item of start date and time, the item of end date and time, the item of migration source, and the item of migration destination in the LM schedule table 152 are presented to the operator.

FIG. 18 is a diagram illustrating exemplary LM execution date and time change request information.

LM execution date and time change request information 133 is inputted to the scheduler 120 by the user terminals 500 and 600.

The LM execution date and time change request information 133 is information indicating the change contents of the LM execution duration for one or more virtual machines. The LM execution date and time change request information includes the item of virtual machine name, the item of start time, the item of end time, and the item of attribute.

The name of a virtual machine is registered to the item of virtual machine name. The start time is registered to the item of start time. The end time is registered to the item of end time. Information indicating that the LM of the corresponding virtual machine is "avoided" or "allowed" during the period from the start time to the end time is registered to the item of attribute. "Avoided" indicates that LM is avoided during the corresponding period. "Allowed" indicates that LM is allowed during the corresponding period.

For example, the LM execution date and time change request information 133 includes information indicating the virtual machine name of "mysql-67", the start time of "2018-06-20T10:40:00.000Z", the end time of "2018-06-20T12:59:00.000Z", and the attribute of "avoided". This indicates that it is requested to avoid LM of the virtual machine with the virtual machine name "mysql-67" during a period from 10:40 on Jun. 20, 2018 to 12:59 on Jun. 20, 2018. It may be considered that the LM is "allowed" for the virtual machine in a period other than the period in which the attribute "avoided" is set.

The LM execution date and time change request information 133 also includes information indicating the virtual machine name of "accounting-db-13", the start time of "2018-06-22T18:00:00.000Z", the end time of "2018-06-22T20:59:00.000Z", and the attribute of "allowed". This indicates that it is requested to execute LM of the virtual machine with the virtual machine name "accounting-db-13" during a period from 18:00 on Jun. 22, 2018 to 20:59 on Jun. 22, 2018. It may be considered that the LM is "avoided" for the virtual machine in a period other than the period in which the attribute "allowed" is set.

As described above, the LM execution date and time change request information 133 includes information indicating a time slot in which virtual machine migration is allowed or a time slot in which virtual machine migration is avoided.

FIG. 19 is a diagram illustrating an exemplary schedule table after change.

A maintenance schedule table 153 is generated by the solver unit 125 and the schedule change unit 128, and stored in the event information storage unit 123. The maintenance schedule table 153 is information after a schedule change to the maintenance schedule table 151. The data structure of the maintenance schedule table 153 is the same as that of the maintenance schedule table 151, and thus description thereof is omitted.

An LM schedule table 154 is generated by the solver unit 125 and the schedule change unit 128, and stored in the event information storage unit 123. The LM schedule table 154 is information after a schedule change to the LM schedule table 152. The data structure of the LM schedule table 154 is the same as that of the LM schedule table 152, and thus description thereof is omitted.

FIG. 20 is a diagram illustrating exemplary variables in a constraint satisfaction problem.

The constraint condition generation unit 124 sets values included in the information exemplarily illustrated in FIGS. 7 to 12 (the information illustrated in FIGS. 17 and 18 is included in the case of rescheduling) as inputs to the constraint satisfaction problem. The solver unit 125 outputs the maintenance schedule table 151 exemplarily illustrated in FIG. 16 and the LM schedule table 152 exemplarily illustrated in FIG. 17 by solving the constraint satisfaction problem, and stores the tables in the event information storage unit 123. In the case of rescheduling, the solver unit 125 and the schedule change unit 128 output the maintenance schedule table 153 and the LM schedule table 154 exemplarily illustrated in FIG. 19, and store the tables in the event information storage unit 123.

For example, the input variables in the constraint satisfaction problem are as follows.

The variable $t_s$ is the start date and time of a maintenance execution duration. As described above, in the case of rescheduling, $t_s$ represents the start date and time of the target period for rescheduling. The variable $t_e$ is the end date and time of the maintenance execution duration. The variable $T=\{t_s, \ldots, t_e\}$ is a set of times obtained by discretizing the maintenance execution duration into units of minutes. A duration from a time in T until right before the next time (time one minute later) is referred to as one time slot. The values of time $t_s$ and time $t_e$ are obtained from the maintenance execution duration information 131.

The variable P is a set of physical machines (PM) as maintenance targets. maintDuration$_p$ represents the maintenance turnaround time of the physical machine p (PM p). The index p indicates a physical machine as a maintenance target. The values of P and maintDuration$_p$ are obtained from the maintenance target machine information 132.

cpuCap$_p$ is the number of CPU cores of PM p. ramCap$_p$ is the memory capacity of PM p. diskCap$_p$ is the disk capacity of PM p. The values of cpuCap$_p$, ramCap$_p$, and diskCap$_p$ are obtained from the physical machine configuration table 141.

The variable V represents a set of virtual machines (VM) as LM schedule adjustment targets. initAccommo$_{pv}$ represents the initial deployment of the virtual machine v (VM v), and indicates 1 when the initial deployment location of the VM v is PM p, and 0 otherwise. The index v indicates a virtual machine as an LM target. The variable V represents a set of virtual machines associated with a physical machine specified by the maintenance target machine information 132 among virtual machines registered to the virtual machine operation table 143. The value of initAccommo$_{pv}$ is obtained from the virtual machine operation table 143. As described above, in the case of rescheduling, the initial deployment location of each virtual machine is the deployment location of each virtual machine at the start date and time of the rescheduling target period.

migrationDuration$_v$ is the LM turnaround time of the VM v. The value of migrationDuration$_v$ is obtained from the virtual machine configuration table 142.

cpuReq$_v$ is the number of CPU cores of the VM v. ramReq$_v$ is the memory capacity of the VM v. diskReq$_v$ is the disk capacity of the VM v. The values of cpuReq$_v$, ramReq$_v$, and diskReq$_v$ are obtained from the virtual machine configuration table 142.

availMigrationTimeSlot$_v$(t) represents the LM execution allowable date and time (or LM execution avoidance date and time), and indicates 1 when LM of the VM v may be executed at time t, and 0 otherwise. The default value of availMigrationTimeSlot$_v$(t) is 1. For example, when there is an LM execution avoidance date and time in a certain virtual machine upon execution of initial scheduling, the LM execution avoidance date and time may be set by availMigrationTimeSlot$_v$(t).

In the case of rescheduling, the value of availMigrationTimeSlot$_v$(t) is obtained based on the LM execution date and time change request information 133 for the change request target virtual machine. In the case of rescheduling, for virtual machines that are not subject to change request, the LM execution scheduled time slot is specified as a constraint by the variables $a_{pv}(t)$ and $l_{pv}(t)$ to be described later, and thus the constraint of availMigrationTimeSlot$_v$(t) does not have to be created. However, a value corresponding to the existing schedule table 152 may be set in availMigrationTimeSlot$_v$(t) for virtual machines that are not subject to change request.

numG$_{af}$ is the number of groups to which the affinity rule is applied. G$_{af}$={G$_{af\_1}$, ..., G$_{af\_numGaf}$} is a set of groups to which the affinity rule is applied. numG$_{aa}$ is the number of groups to which the anti-affinity rule is applied. G$_{aa}$={G$_{aa\_1}$, ..., G$_{aa\_numGaa}$} is a set of groups to which the anti-affinity rule is applied. The values of numG$_{af}$, G$_{af}$, numG$_{aa}$, and G$_{aa}$ are obtained from the dependency relation table 144.

As described above, the constraint information related to the constraint satisfaction problem includes constraints related to the maintenance execution duration of a plurality of physical machines, the configuration information of the plurality of physical machines and the plurality of virtual machines, and the migration turnaround time for a virtual machine from one physical machine to another.

For example, output variable are as follows.

The variable $m_p(t)$ represents a maintenance execution duration per PM, and indicates one when PM p is under maintenance at time t, or zero otherwise. $m_p(t)$ is used to create the maintenance schedule table 151 (in the case of rescheduling, the maintenance schedule table 153).

The variable $a_{pv}(t)$ represents a physical machine as a VM deployment target, and indicates one when VM v is operating on PM p at time t, or zero otherwise. The variable $l_{pv}(t)$ represents change of VM deployment targets by LM, and indicates one when LM of VM v to PM p is completed at time t, or zero otherwise. $a_{pv}(t)$ and $l_{pv}(t)$ are used to create the LM schedule table 152 (in the case of rescheduling, the LM schedule table 154).

In the case of rescheduling, for virtual machines with no request to change the LM execution date and time, $a_{pv}(t)$ and $l_{pv}(t)$ are set according to the existing LM schedule table 152, which are also used as input variables (constraint conditions) in the constraint satisfaction problem.

The expression of LM by the above-mentioned variables migrationDuration$_v$, I$_{pv}$(t) and a$_{pv}$(t) is illustrated.

Figures 21A, 21B, 21C:
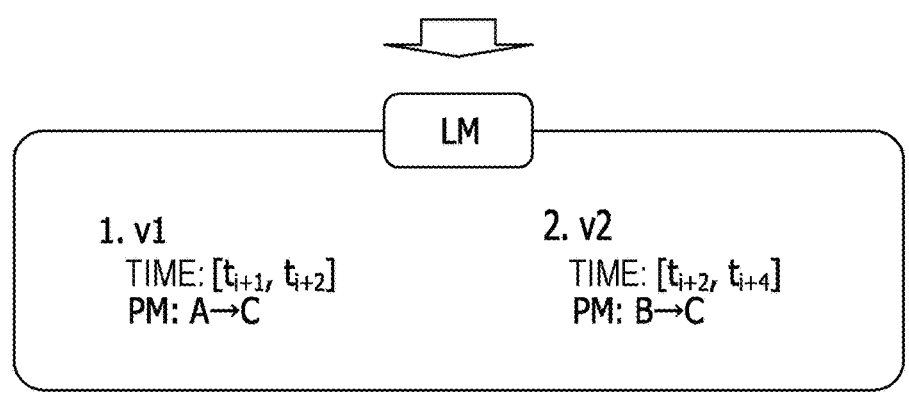
FIGS. 21A, 21B, and 21C are diagrams illustrating exemplary LM expression with variables.

FIGS. 21A, 21B, and 21C are diagrams illustrating exemplary expression of LM with variables.

FIG. 21A illustrates migrationDuration$_v$ for virtual machines v1 and v2 at times t$_i$, t$_{i+1}$, . . . , t$_{i+5}$.

For example, migrationDuration$_{v1}$=2. This indicates that two time slots are used to complete LM of the virtual machine v1 at each time.

migrationDuration$_{v2}$=3. This indicates that three time slots are used to complete LM of the virtual machine v2 at each time.

In the example of the second embodiment, the LM turnaround time for each virtual machine is fixed at each time. However, the LM turnaround time of the virtual machine may vary depending on the load on the virtual machine. In such a case, it is possible to set a different number of time slots required to complete the LM for each time with migrationDuration$_v$=migrationDuration$_v$(t).

FIG. 21B illustrates I$_{pv}$ (where p=C) for virtual machines v1 and v2 at times t$_i$, t$_{i+1}$, . . . , t$_{i+5}$.

For example, I$_{pv1}$(t$_{i+2}$) is one, and I$_{pv1}$(t) is zero at any other time. This indicates that LM of the virtual machine v1 to a physical machine C is completed at time t$_{i+2}$. As illustrated in FIG. 21A, two time slots are used to complete LM of the virtual machine v1 at time t$_{i+2}$. Accordingly, LM of the virtual machine v1 is executed in a duration of two time slots indicated by times t$_{i+1}$ and t$_{i+2}$.

For example, I$_{pv2}$(t$_{i+4}$) is one, and I$_{pv2}$(t) is zero at any other time. This indicates that LM of the virtual machine v2 to a physical machine C is completed at time t$_{i+4}$. As illustrated in FIG. 21A, three time slots are used to complete LM of the virtual machine v2 at time t$_{i+4}$. Accordingly, LM of the virtual machine v2 is executed in a duration of three time slots indicated by times t$_{i+2}$, t$_{i+3}$, and t$_{i+4}$.

FIG. 21C exemplarily illustrates p (physical machine) with a$_{pv}$(t)=1 for the virtual machines v1 and v2 at times t$_i$, t$_{i+1}$, . . . , t$_{i+5}$.

For example, p with a$_{pv1}$(t)=1 is the physical machine A (LM migration source of the virtual machine v1) at times t$_i$, t$_{i+1}$, . . . , t$_{i+2}$. Then, as exemplarily illustrated in FIG. 21B, LM of the virtual machine v1 to the physical machine C is completed at time t$_{i+2}$. Accordingly, p with a$_{pv1}$(t)=1 is the physical machine C at time t$_{i+3}$ or later.

p with a$_{pv2}$(t)=1 is the physical machine B (LM migration source of the virtual machine v2) at times t$_i$, t$_{i+1}$, . . . , t$_{i+4}$. Then, as exemplarily illustrated in FIG. 21B, LM of the virtual machine v2 to the physical machine C is completed at time t$_{i+4}$. Accordingly, p with a$_{pv2}$(t)=1 is the physical machine C at time t$_{i+5}$ or later.

As described above, the variables migrationDuration$_v$, I$_{pv}$(t), and a$_{pv}$(t) represent the following contents for LM of the virtual machines v1 and v2.

For the virtual machine v1, the LM execution duration is time [t$_{i+1}$, t$_{i+2}$] (from time t$_{i+1}$ to time t$_{i+2}$), the migration source is the physical machine A, and the migration destination is the physical machine C.

For the virtual machine v2, the LM execution duration is time [t$_{i+2}$, t$_{i+4}$] (from time t$_{i+2}$ to time t$_{i+4}$), the migration source is the physical machine A, and the migration destination is the physical machine C.

The constraint condition generation unit 124 generates a constraint condition using the variables exemplarily described above. The solver unit 125 produces the maintenance schedule table 151 and the LM schedule table 152 by solving a constraint satisfaction problem related to the generated constraint condition. In the case of rescheduling, the solver unit 125 and the schedule change unit 128 produce the maintenance schedule table 153 and the LM schedule table 154 by solving a constraint satisfaction problem related to the generated constraint condition.

The following describes an exemplary constraint condition generated by the constraint condition generation unit 124.

A first constraint condition is such that VM v activates on PM p as an initial deployment target. The first constraint condition is expressed by Expression (2).

$$a_{pv}(t_s) = \text{initAcco}_{pv}, \forall p \in P, \forall v \in V \quad (2)$$

A second constraint condition is such that maintenance is once performed on PM p. The second constraint condition is expressed by Expressions (3) and (4). In particular, Expression (3) indicates that a continuous maintenance duration equal to or longer than maintDuration$_p$ is allocated to each PM p. Expression (4) indicates that the sum of the maintenance durations is equal to maintDuration$_p$.

$$\text{maintDuration}_p \sum_{i=2} m_p(t-i) - (\text{maintDuration}_p - 1)m_p(t-1) + \\ (\text{maintDuration}_p - 1)m_p(t) \geq 0, \quad \forall p \in P, \quad \forall t \in T - \{t_s\} \quad (3)$$

$$\sum_{t \in T} m_p(t) = \text{maintDuration}_p, \quad \forall p \in P \quad (4)$$

A third constraint condition is such that the number of PMs on which maintenance is allowed to be performed all at once is equal to or smaller than C$_m$. The constant C$_m$ is predetermined in accordance with the system. The third constraint condition is expressed by Expression (5).

$$\sum_{p \in P} m_p(t) \leq C_m, \quad \forall t \in T \quad (5)$$

A fourth constraint condition is such that VM v operates on any PM p at all time. The fourth constraint condition is expressed by Expression (6).

$$\sum_{p \in P} a_{pv}(t) = 1, \quad \forall v \in V, \quad \forall t \in T \quad (6)$$

A fifth constraint condition is such that the sum of a required resource amount of each VM operating on PM p is equal to or smaller than a provided resource amount of PM p and no VM operates on PM p while maintenance is perform on PM p. The fifth constraint condition is expressed by Expressions (7), (8), and (9). In particular, Expression (7) indicates a constraint condition related to the number of CPU cores. Expression (8) indicates a constraint condition related to a memory capacity. Expression (9) indicates a constraint condition related to a disk capacity.

$$\sum_{v \in V} \text{cpuReq}_v \cdot a_{pv}(t) \leq \{1 - m_p(t)\} \text{cpuCap}_p, \quad \forall p \in P, \quad \forall t \in T \quad (7)$$

$$\sum_{v \in V} ramReq_v \cdot a_{pv}(t) \le \{1 - m_p(t)\}ramCap_p, \quad \forall\, p \in P,\, \forall\, t \in T \qquad (8)$$

$$\sum_{v \in V} diskReq_v \cdot a_{pv}(t) \le \{1 - m_p(t)\}diskCap_p, \quad \forall\, p \in P,\, \forall\, t \in T \qquad (9)$$

The sixth constraint condition is that the time when VM v operates on PM p is migrationDuration$_v$+1 or more. The sixth constraint condition is expressed by Expression (10). The sixth constraint condition reflects that VM v is continuously operating for a period equal to or greater than migrationDuration$_v$+1 for LM. The reason for "+1" (adding 1) to migrationDuration$_v$ is that it is unlikely that another LM will be executed immediately after the LM is completed.

$$\{migrationDuration_v + 1\}[a_{pv}(t) \cap \{1 - a_{pv}(t+1)\}] \le \qquad (10)$$
$$\sum_{i=0}^{migrationDuration_v} a_{pv}(t-i),$$

$$\forall\, p \in P,\, \forall\, v \in V,\, \forall\, t \in T - \{t_e\}$$

The seventh constraint condition indicates LM detection. The seventh constraint condition is expressed by Expression (11). $l_{pv}(t)$ indicates 1 when LM of VM v to PM p is completed at time t, or 0 otherwise.

$$\{1 - a_{pv}(t)\} \cap a_{pv}(t+1) = l_{pv}(t),\, \forall p \in P,\, \forall v \in V, \forall t \in T - \{t_e\} \qquad (11)$$

An eighth constraint condition is such that LM of VM v is performed only in an allowed duration. The eighth constraint condition is expressed by Expression (12). However, as described above, in the case of rescheduling, the eighth constraint condition may not be created for some virtual machines (virtual machines with no request to change the LM execution time slot).

$$\sum_{i=0}^{migrationDuration_v - 1} availMigrationTimeSlot_v(t-i) - \qquad (12)$$
$$migrationDuration_v \sum_{p \in P} l_{pv}(t) \ge 0,$$

$$\forall\, v \in V,\, \forall\, t \in T$$

A ninth constraint condition is such that LM to PM p under maintenance is disallowed. The ninth constraint condition is expressed by Expression (13).

$$migrationDuration_v \cdot l_{pv}(t) \le \sum_{i=0}^{migrationDuration_v - 1} \{1 - m_p(t-i)\}, \qquad (13)$$

$$\forall\, p \in P,\, \forall\, v \in V,\, \forall\, t \in T$$

A tenth constraint condition is such that the number of VMs of which LM is allowed to be performed all at once is equal to or smaller than $C_l$. The constant $C_l$ is predetermined in accordance with the system. The tenth constraint condition is expressed by Expression (14).

$$\sum_{i=0}^{migrationDuration_v - 1} \sum_{p \in P} \sum_{v' \in V} l_{pv'}(t-i) \le C_l, \qquad (14)$$

$$\forall\, v \in V,\, \forall\, t \in T$$

An eleventh constraint condition is such that each VM belonging to a group to which the anti-affinity rule is applied is disallowed to operate on an identical PM. The eleventh constraint condition is expressed by Expression (15).

$$\sum_{v \in G_{aa\_i}} a_{pv}(t) \le 1, \quad \forall\, p \in P,\, \forall\, t \in T,\, \forall\, i \in \{1, \ldots, numG_{aa}\} \qquad (15)$$

A twelfth constraint condition is such that each VM belonging to a group to which the affinity rule is applied is operated on an identical PM. The twelfth constraint condition is expressed by Expression (16).

$$\left\{\sum_{v \in G_{af\_i}} a_{pv}(t)\right\} \bmod |G_{af\_i}| = 0, \qquad (16)$$

$$\forall\, p \in P,\, \forall\, t \in T,\, \forall\, i \in \{1, \ldots, numG_{af}\}$$

The thirteenth constraint condition is an objective function of the constraint satisfaction problem, which is to complete the entire maintenance work at the earliest time. The thirteenth constraint condition is expressed by Expression (17). For example, the thirteenth constraint condition is a constraint condition in response to a desire to end the maintenance by the operator quickly.

$$\text{minimize } \max(t) \text{ s.t. } l_{pv}(t) = 1 \qquad (17)$$

The following describes the procedure of processing performed by the management server 100. The following mainly illustrates the case of rescheduling. Therefore, the procedure illustrated below is started from a state where the initially produced maintenance schedule table 151 and the LM schedule table 152 are stored in the event information storage unit 123.

Figure 22:
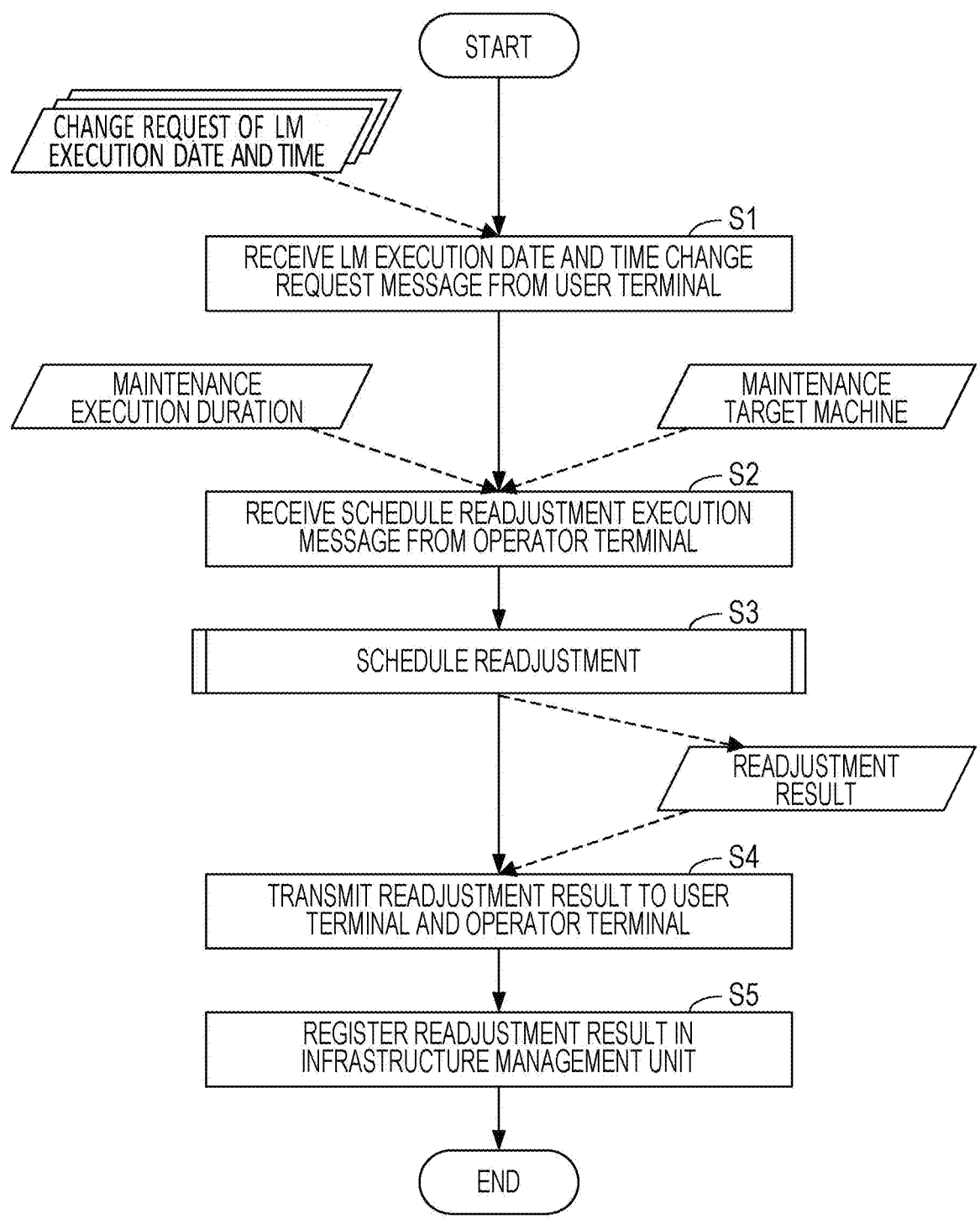
FIG. 22 is a flowchart illustrating exemplary processing at the management server.

FIG. 22 is a flowchart illustrating exemplary processing performed by the management server.

(S1) The scheduler 120 receives from the user terminals 500 and 600 a message requesting change of the LM execution date and time. The message includes LM execution date and time change request information 133. The LM execution date and time change request information 133 may include change requests for a plurality of virtual machines.

(S2) The scheduler 120 receives a message of execution of schedule readjustment from the operator terminal 700. This message includes the maintenance execution duration information 131 and the maintenance target machine information 132. In the case of rescheduling, the start date and time indicated by the maintenance execution duration information 131 is the start date and time of the rescheduling target period.

When rescheduling is performed after the initial maintenance execution start date and time, maintenance may have been performed for some physical machines. In this case, the scheduler 120 does not calculate the variable $m_p(t)$ for the physical machine for which maintenance has been performed (the constraints do not have to be satisfied for the physical machine).

(S3) The scheduler 120 executes schedule readjustment and outputs the readjustment result (rescheduling result) to the event information storage unit 123. The schedule readjustment will be described in detail later.

(S4) The scheduler 120 transmits the readjustment result to the user terminals 500 and 600 and the operator terminal 700. The readjustment results are displayed on the respective displays of the user terminals 500 and 600 and the operator terminal 700.

(S5) The scheduler 120 registers the readjustment result in the infrastructure management unit 110. Thus, the infrastructure management control unit 113 instructs each physical machine to perform LM based on the readjustment result. Then, the processing performed by the management server 100 is terminated.

Figure 23:
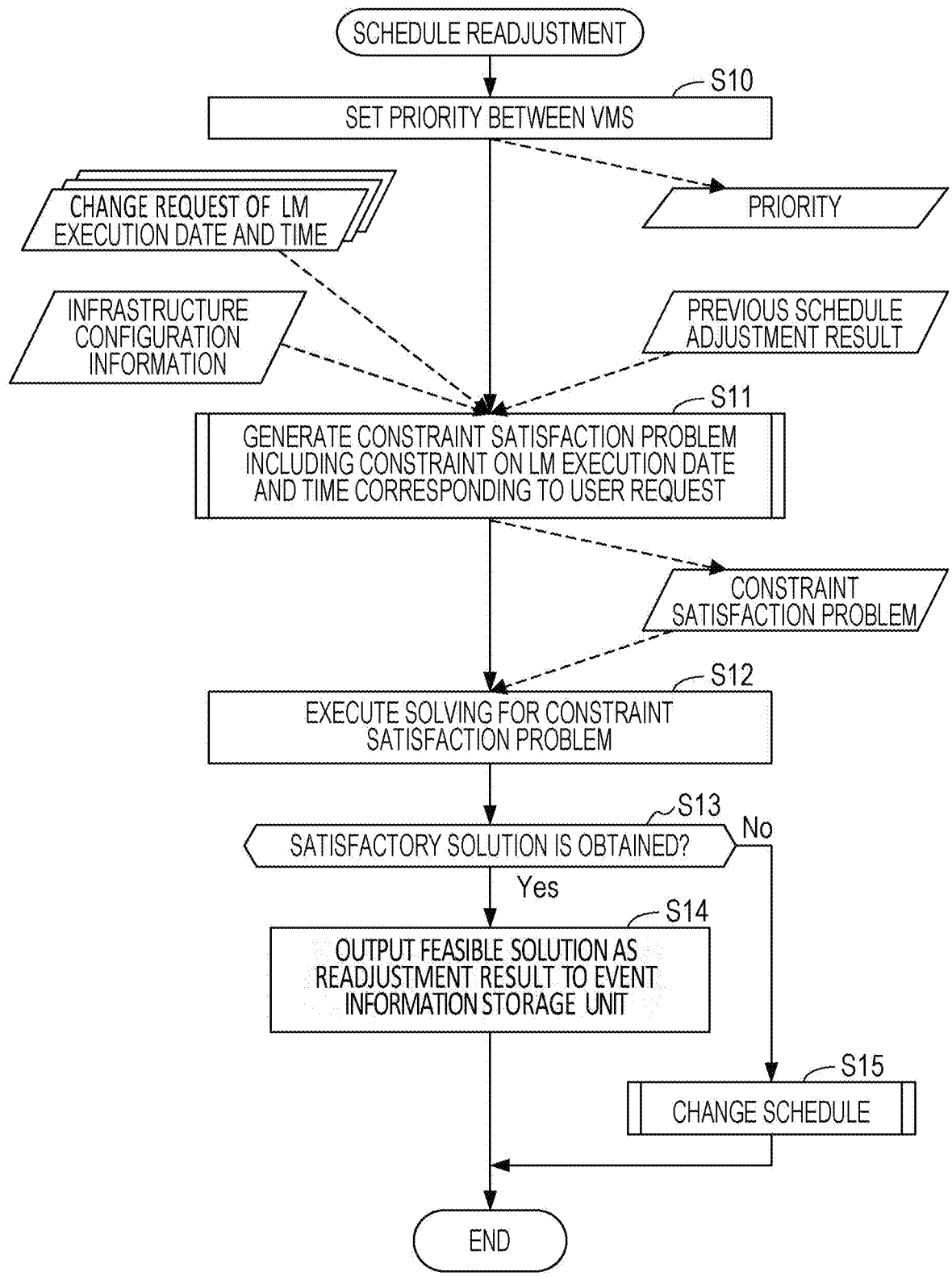
FIG. 23 is a flowchart illustrating exemplary schedule readjustment.

FIG. 23 is a flowchart illustrating exemplary schedule readjustment.

The schedule readjustment processing corresponds to step S3.

(S10) The VM priority setting unit 127 sets the priority between virtual machines (VM). For example, as illustrated in FIG. 15, the VM priority setting unit 127 determines the priority of the virtual machine based on the usage information 146a for each virtual machine to generate the priority table 146, and stores the generated priority table 146 in the VM priority storage unit 122.

(S11) The constraint condition generation unit 124 generates a constraint satisfaction problem including constraints related to the LM execution date and time according to the user request. The constraint satisfaction problem generation processing will be described in detail later.

(S12) The solver unit 125 solves the constraint satisfaction problem generated in step S11 to calculate the value of each output variable at each time in the rescheduling target duration.

(S13) The solver unit 125 determines whether or not any feasible solution to the constraint satisfaction problem is obtained in step S12. When a feasible solution is obtained, the processing proceeds to step S14. When no feasible solution is obtained, the processing proceeds to step S15.

(S14) The solver unit 125 outputs the feasible solution obtained in step S12 as the readjustment result (rescheduling result) to the event information storage unit 123. Then, the schedule readjustment processing is terminated.

(S15) The unsatisfiable core extraction unit 126 and the schedule change unit 128 execute schedule change. The schedule change will be described in detail later. Then, the schedule readjustment processing is terminated.

Figure 24:
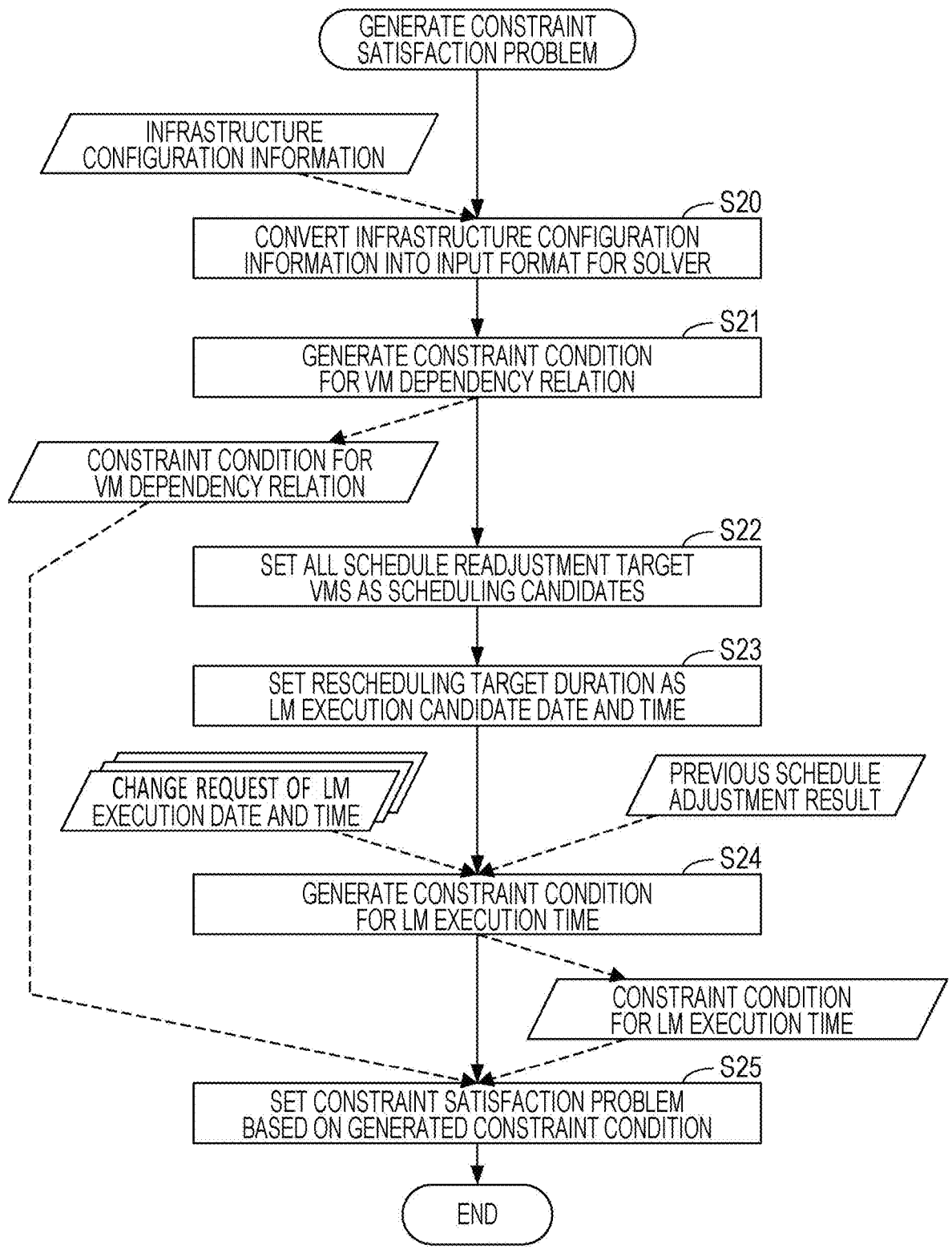
FIG. 24 is a flowchart illustrating exemplary generation of a constraint satisfaction problem.

FIG. 24 is a flowchart illustrating exemplary constraint satisfaction problem generation.

The constraint satisfaction problem generation processing corresponds to step S11.

(S20) The constraint condition generation unit 124 converts infrastructure configuration information into the format of data input to the solver unit 125. The infrastructure configuration information includes the physical machine configuration table 141, the virtual machine configuration table 142, the virtual machine operation table 143, and the dependency relation table 144.

(S21) The constraint condition generation unit 124 generates a constraint condition related to a virtual machine (VM) dependency relation. The constraint condition related to the VM dependency relation is, for example, the above-described first, fourth, fifth, eleventh, and twelfth constraint conditions. The constraint condition generation unit 124 stores the generated constraint condition in the constraint condition storage unit 121.

(S22) The constraint condition generation unit 124 sets all virtual machines (VMs) as LM rescheduling targets to be rescheduling candidates. However, rescheduling is performed so that existing schedules are maintained as much as possible for virtual machines with no request to change the LM execution date and time among all the virtual machines.

(S23) The constraint condition generation unit 124 sets the rescheduling target period to be the LM execution candidate date and time. For example, the constraint condition generation unit 124 sets $T=\{t_s, \ldots, t_e\}$ based on the maintenance execution duration information 131.

(S24) The constraint condition generation unit 124 generates a constraint condition related to LM execution time. The constraint condition related to the LM execution time is, for example, the above-described second, third, sixth to tenth, and thirteenth constraint conditions. The constraint condition generation unit 124 sets the value of availMigrationTimeSlot$_v$(t) for the virtual machine as the LM execution date and time change target based on the LM execution date and time change request information 133 for the eighth constraint condition. For example, availMigrationTimeSlot$_v$(t)=1 is set in the time slot where LM execution is requested in the LM execution date and time change request information 133 (time slot not to be avoided), and availMigrationTimeSlot$_v$(t)=0 in other time slots.

On the other hand, the constraint condition generation unit 124 does not have to create the eighth constraint condition for virtual machines that are not subject to change of the LM execution date and time. Instead, the constraint condition generation unit 124 sets the values of variables $a_{pv}(t)$ and $I_{pv}(t)$ at each time t so as to reflect the existing LM schedule based on the existing LM schedule table 152 for virtual machines that are not subject to change of the LM execution date and time. The values of the variables $a_{pv}(t)$ and $I_{pv}(t)$ are the constraint conditions related to the LM execution time slot for the virtual machines that are not subject to change of the LM execution date and time.

(S25) The constraint condition generation unit 124 sets a constraint satisfaction problem based on the constraint conditions generated at steps S21 and S24. Then, the constraint satisfaction problem generation processing is terminated.

Figure 25:
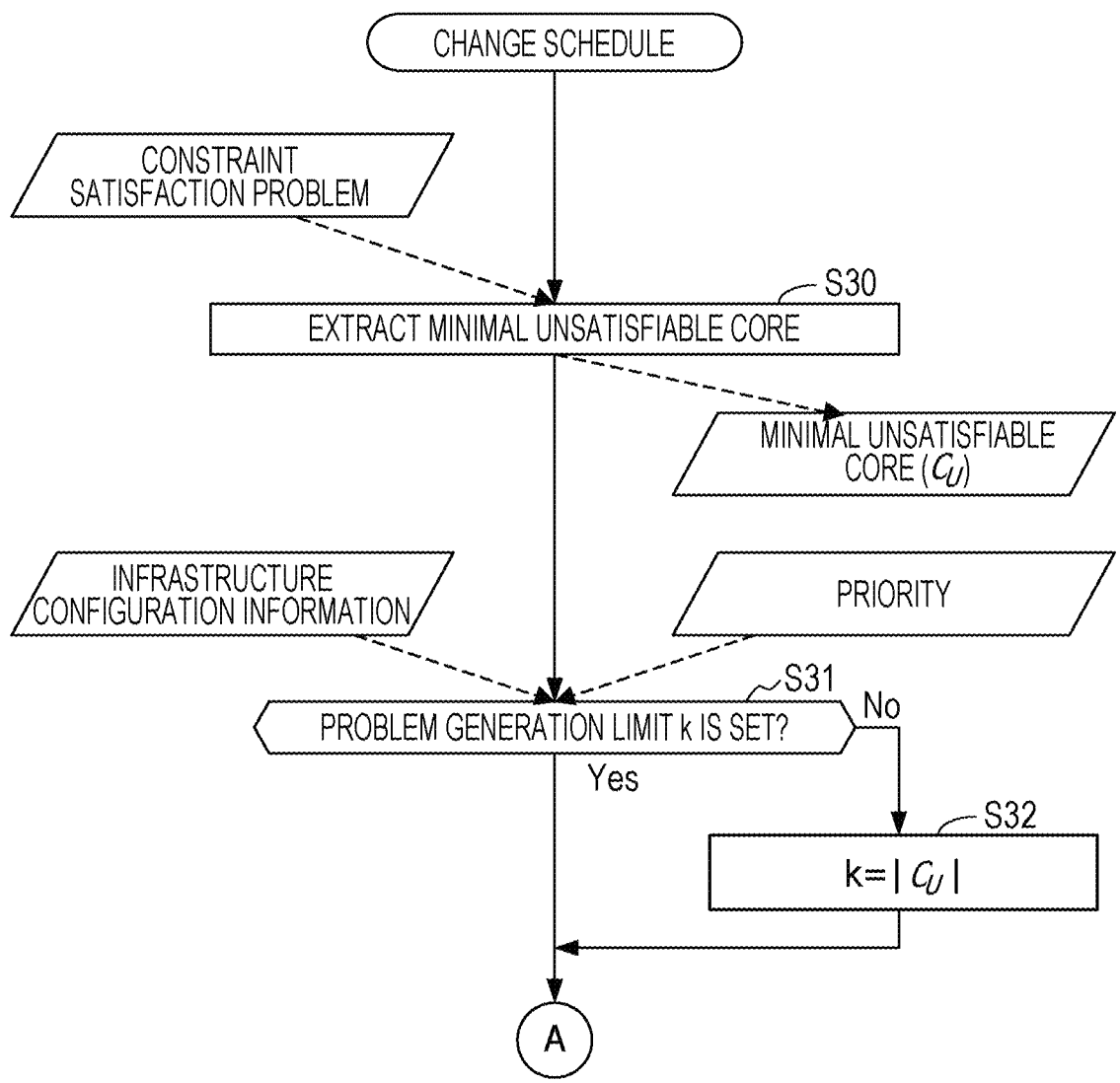
FIG. 25 is a flowchart illustrating exemplary schedule change.

FIG. 25 is a flowchart illustrating exemplary schedule change.

The schedule change processing corresponds to step S15.

(S30) The unsatisfiable core extraction unit 126 extracts a minimal unsatisfiable core from the constraint condition related to the LM execution time of the virtual machine from the constraint set included in the constraint satisfaction problem generated in step S11 (step S25). The unsatisfiable core extraction unit 126 provides the extracted minimal unsatisfiable core ($C_U$) to the schedule change unit 128.

(S31) The schedule change unit 128 acquires the infrastructure configuration information and the priority table 146, and determines whether or not the limit k for generating the semi-constraint satisfaction problem is set. When the limit k is set, the processing proceeds to step S33. When the limit k is not set, the processing proceeds to step S32. The limit k is preset in the constraint condition storage unit 121, for example.

(S32) The schedule change unit 128 sets the number of elements of the minimal unsatisfiable core (the number of constraint conditions belonging to the minimal unsatisfiable core) to be the limit k. In other words, the schedule change unit 128 sets k=|$C_U$| (where |$C_U$| indicates the number of elements of the minimal unsatisfiable core $C_U$). Then, the processing proceeds to step S33.

Figure 26:
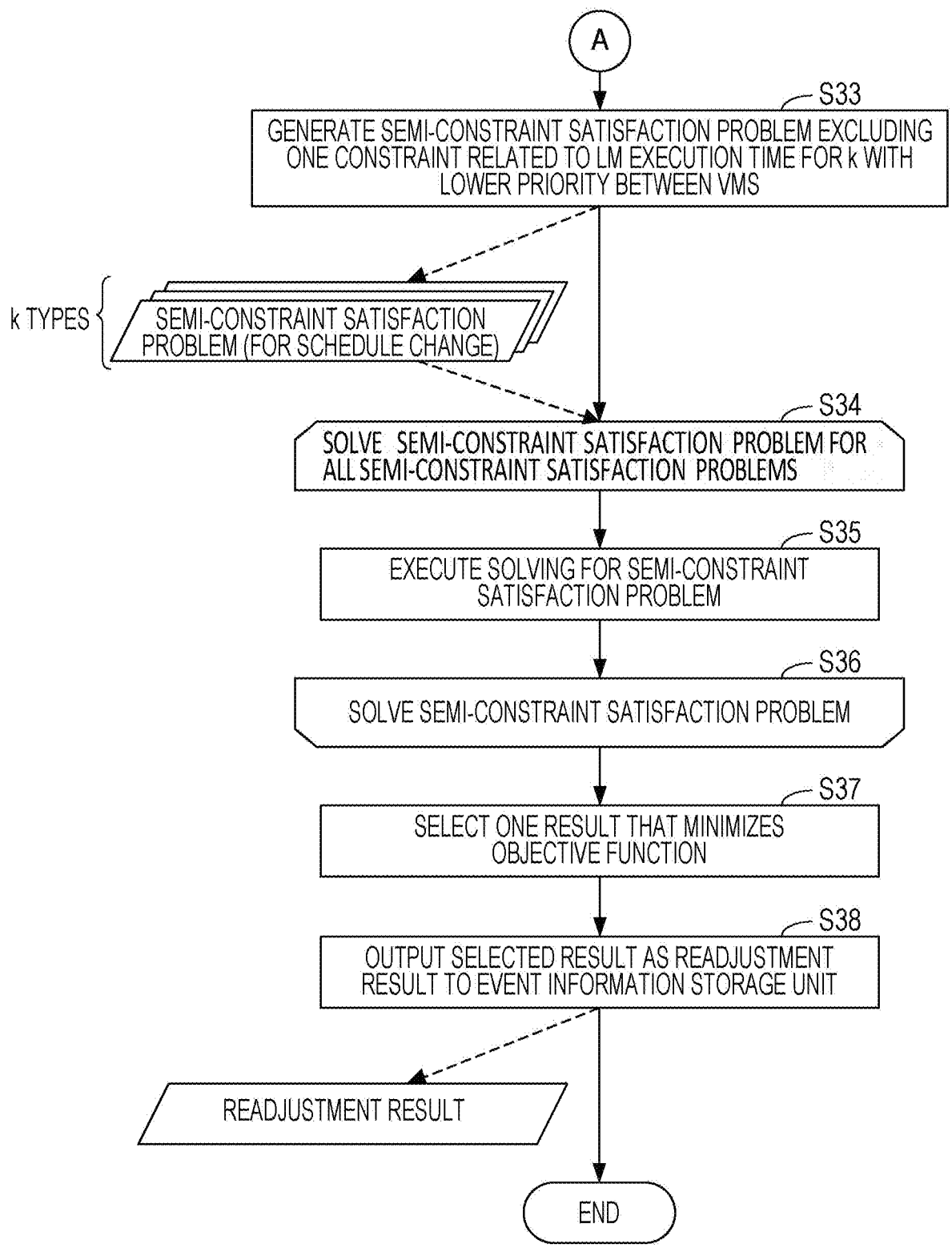
FIG. 26 is a flowchart illustrating exemplary schedule change (continued)

FIG. 26 is a flowchart illustrating exemplary schedule change (continued).

(S33) The schedule change unit 128 generates a semi-constraint satisfaction problem by excluding one constraint on the LM execution time for the lower-priority k virtual machines (VMs) from the corresponding constraint satisfaction problem, based on the priority table 146. Thus, the schedule change unit 128 generates k types of semi-constraint satisfaction problems.

For example, when a constraint on a virtual machine with a request to change the LM execution date and time is excluded, availMigrationTimeSlot$_v$(t)=1 is set at all times for the virtual machine.

On the other hand, when a constraint on a virtual machine with no request to change the LM execution date and time is excluded, a constraint with availMigrationTimeSlot$_v$(t)=1 at all times for the virtual machine is added to input data 165 to be described later. The constraints of $a_{p,v}(t)$ and $I_{p,v}(t)$ on the existing schedule are deleted from the input data 166 for the virtual machine.

(S34) The schedule change unit 128 repeatedly performs solution processing for each semi-constraint satisfaction problem. The processing of steps S34 to S36 may be executed in parallel by the management server 100.

(S35) The schedule change unit 128 solves the semi-constraint satisfaction problem. The schedule change unit 128 may use the solver unit 125 to solve the semi-constraint satisfaction problem.

(S36) Upon completion of solving the k types of semi-constraint satisfaction problems, the schedule change unit 128 completes the repetition of the solution processing. Then, the processing proceeds to step S37. The schedule change unit 128 obtains k rescheduling results by solving the k types of semi-constraint satisfaction problems.

(S37) The schedule change unit 128 selects one result that minimizes the objective function from among the k rescheduling results. For example, the objective function is expressed by the following Expressions (18) and (19).

$$\text{minimize } |l_t(v) - r_t(v)| \quad (18)$$

$$\text{minimize } |l_t(v) - l'_t(v)| \quad (19)$$

Expression (18) is an objective function for a virtual machine with LM execution date and time change request. Expression (19) is an objective function for a virtual machine with no LM execution date and time change request. The variable $l_t(v)$ is the LM execution start time (the current rescheduling result) of the virtual machine v in the rescheduling result. The variable $l'_t(v)$ is the scheduled LM execution start time (previous scheduling result) of the virtual machine v. The variable $r_t(v)$ is a request time (time when LM execution is requested) for the LM execution of the virtual machine v. Any time difference is represented by a positive value.

Expression (18) indicates that the difference between the requested desired time slot and the new scheduled time slot after rescheduling is minimized for the virtual machine with the LM execution date and time change request.

The difference $\Delta T$ between the desired time slot $T_1$ to $T_2$ ($T_1 < T_2$) and the new scheduled time slot $T_3$ to $T_4$ ($T_3 < T_4$) is expressed as follows, for example. When $T_1 \leq T_3 < T_2$ and $T_1 < T_4 \leq T_2$, $\Delta T = 0$. When $T_3 < T_1$ and $T_4 \leq T_2$, $\Delta T = T_1 - T_3$. When $T_1 \leq T_3$ and $T_2 < T_4$, $\Delta T = T_4 - T_2$. When $T_3 < T_1$ and $T_2 < T_4$, $\Delta T = (T_1 - T_3) + (T_4 - T_2)$. When the LM execution avoidance date and time is specified for a certain virtual machine, there are sometimes multiple desired time slots in which LM execution is allowed (for example, multiple time slots divided by the LM execution avoidance date and time). In this case, the schedule change unit 128 uses the smallest difference among the differences between each desired time slot and the new scheduled time slot as the difference between the desired time slot and the new scheduled time slot for the virtual machine.

Expression (19) indicates that the difference between existing scheduled time slot and the new scheduled time slot after rescheduling (time difference between LM start times) is minimized for the virtual machine with no LM execution date and time change request.

(S38) The schedule change unit 128 outputs the result selected in step S37 as the readjustment result (rescheduling result) to the event information storage unit 123. Then, the schedule change processing is terminated.

In step S37, the schedule change unit 128 selects a rescheduling result that minimizes either the output value of the objective function (first objective function) for the virtual machine with the LM execution date and time change request or the output value of the objective function (second objective function) for the virtual machine with no LM execution date and time change request. Alternatively, the schedule change unit 128 may select a rescheduling result that minimizes the sum of the output values of the first and second objective functions.

As described above, when no rescheduling result that satisfies the constraint satisfaction problem (constraint information) is obtained, the management server 100 selects constraints included in the minimal unsatisfiable core extracted from the constraint group related to the LM execution time slot belonging to the constraint satisfaction problem as the exclusion target. Thus, the constraint satisfaction problem may be changed to a satisfiable semi-constraint satisfaction problem, making it possible to acquire the rescheduling result. In this event, since only one constraint is to be excluded in the semi-constraint satisfaction problem, rescheduling may be performed with the least influence on the existing schedule result.

When selecting a constraint to be excluded, the management server 100 selects some of the constraints included in the minimal unsatisfiable core based on the priority of each of the plurality of virtual machines. Thus, it is possible to speed up the processing compared to rescheduling by creating a semi-constraint satisfaction problem by excluding all the constraints included in the minimal unsatisfiable core. For example, since the constraint of a virtual machine having a relatively high priority may be excluded from the exclusion target according to the priority of each virtual machine, the influence on a virtual machine that performs important processing may be suppressed.

The management server 100 outputs a rescheduling result that reduces a first difference in LM execution time of another virtual machine with no change request between the rescheduling result and the existing schedule, or a second difference in LM execution time slot of the virtual machine between the LM execution date and time change request and the rescheduling result. This makes it possible to perform rescheduling in accordance with the LM execution date and time change request while suppressing the influence on the existing LM schedule.

For example, the use of Expression (18) for the objective function makes it possible to change the date and time that satisfy the request as much as possible for the virtual machine with LM execution date and time change request, thereby suppressing the influence on the scheduled use of the virtual machine by the user. The use of Expression (19) as the objective function makes it possible to suppress the influence on the virtual machine with no LM execution date and time change request.

The following illustrates input data to the solver unit 125 during rescheduling and output data from the solver unit 125 (and the schedule change unit 128) corresponding to the input data.

Figure 27:
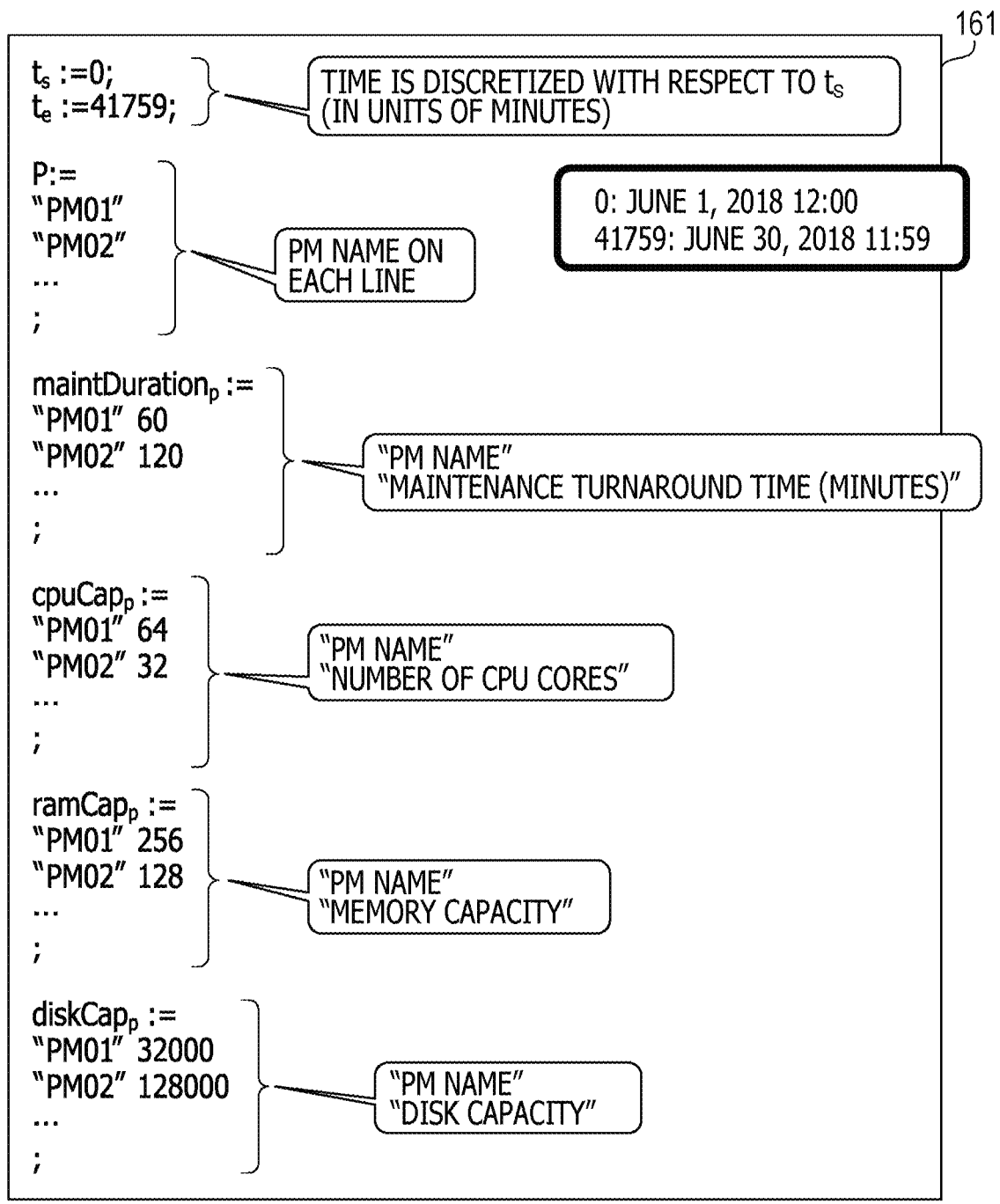
FIG. 27 is a diagram illustrating exemplary input data (part 1)

FIG. 27 is a diagram illustrating exemplary input data (part 1).

The input data 161 includes variables $t_s$, $t_e$, P, maintDuration$_p$, cpuCap$_p$, ramCap$_p$, and diskCap$_p$.

The expressions $t_s:=0$; and $t_e:=41759$; represent a maintenance execution duration (in the expressions, ":=" represents substitution, and ";" represents the end of substitution to a variable). The expression $t_s:=0$ indicates 12:00 on Jun. 1, 2018 as the start date and time of the maintenance execution duration (rescheduling target duration). The expression $t_e:=41759$ indicates 11:59 on Jun. 30, 2018 as the end date and time of the maintenance execution duration (rescheduling target duration). The set T is a set of values obtained discretizing a time between $t_s$ and $t_e$ into units of minutes.

The expression P:="PM01", "PM02", . . . ; represents a set of physical machine names (PM names) (in FIG. 27, each line includes a physical machine name).

The expression maintDuration$_p$:=("PM01" 60), ("PM02" 120), . . . ; represents the maintenance turnaround time (in units of minutes) of each physical machine. One record includes a pair of "physical machine name (PM name)" and "maintenance turnaround time". In FIG. 27, one line includes one record (this is same for the following other variables included in input data).

The expression cpuCap$_p$:=("PM01" 64), ("PM02" 32), . . . ; represents the number of CPU cores of each physical machine. One record includes a pair of "PM name" and "the number of CPU cores".

The expression ramCap$_p$:=("PM01" 256), ("PM02" 128), . . . ; represents the memory capacity of each physical machine. One record includes a pair of "PM name" and "memory capacity".

The expression diskCap$_p$:=("PM01" 32000), ("PM02" 128000), . . . ; represents the disk capacity of each physical machine. One record includes a pair of "PM name" and "disk capacity".

FIG. 28 is a diagram illustrating exemplary input data (part 2).

The input data 162 includes the variable V and initAccommo$_{pv}$.

The expression V:="accounting-db-13", "vm-67", . . . ; represents a set of virtual machine names (VM names).

The expression initAccommo$_{pv}$:=( . . . , "PM01" "mysql-67" 1), ("PM02" "mysql-67" 0), ("PM01" "accounting-db-03" 1), ("PM02" "accounting-db-03"0), . . . ; represents the physical machine that is the initial deployment location of each virtual machine. One record includes a set of "PM name", "virtual machine name (VM name)", and "0 or 1" (the last value is "1" when the physical machine is the initial disposition target of the virtual machine, or "0" otherwise).

FIG. 29 is a diagram illustrating exemplary input data (part 3).

The input data 163 includes a variable migrationDuration$_v$.

The expression migrationDuration$_v$:=. . . , ("server-90" 15), ("mysql-67" 10), . . . , ("accounting-db-03" 20), ("accounting-web-03" 20), . . . ; represents LM turnaround time for each virtual machine. One record includes a pair of "VM name" and "time LM turnaround time (minutes)".

Figure 30:
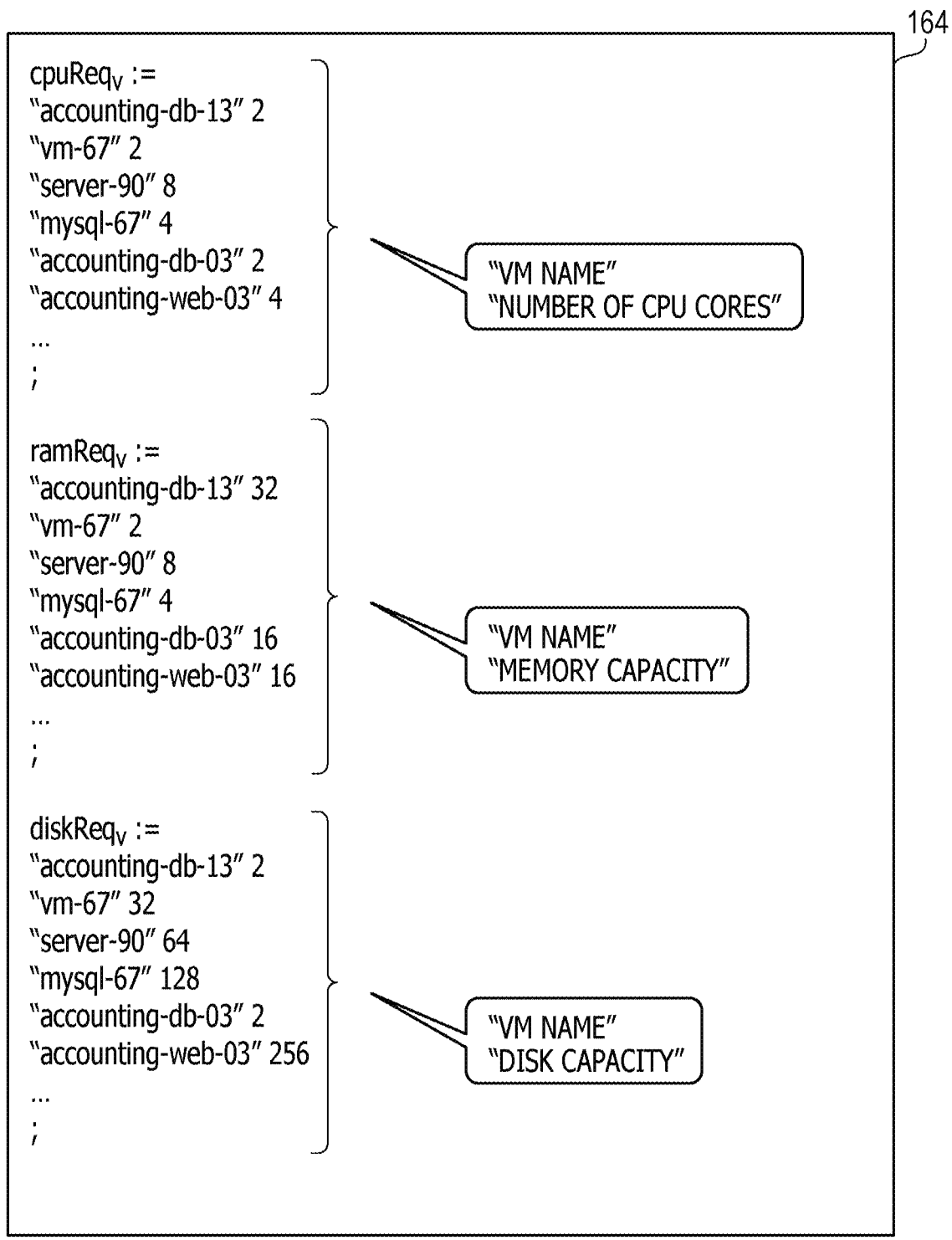
FIG. 30 is a diagram illustrating exemplary input data (part 4)

FIG. 30 is a diagram illustrating exemplary input data (part 4).

The input data 164 includes variables cpuReq$_v$, ramReq$_v$, and diskReq$_v$.

The expression cpuReq$_v$:=("accounting-db-13" 2), ("vm-67" 2), . . . ; represents the number of CPU cores allocated to each virtual machine. One record includes a pair of "VM name" and "the number of CPU cores".

The expression ramReq$_v$:=("accounting-db-13" 32), ("vm-67" 2), . . . ; represents the memory capacity allocated to each virtual machine. One record includes a pair of "VM name" and "memory capacity".

The expression diskReq$_v$:=("accounting-db-13" 2), ("vm-67" 32), . . . ; represents the disk capacity allocated to each virtual machine. One record includes a pair of "VM name" and "disk capacity".

Figure 31:
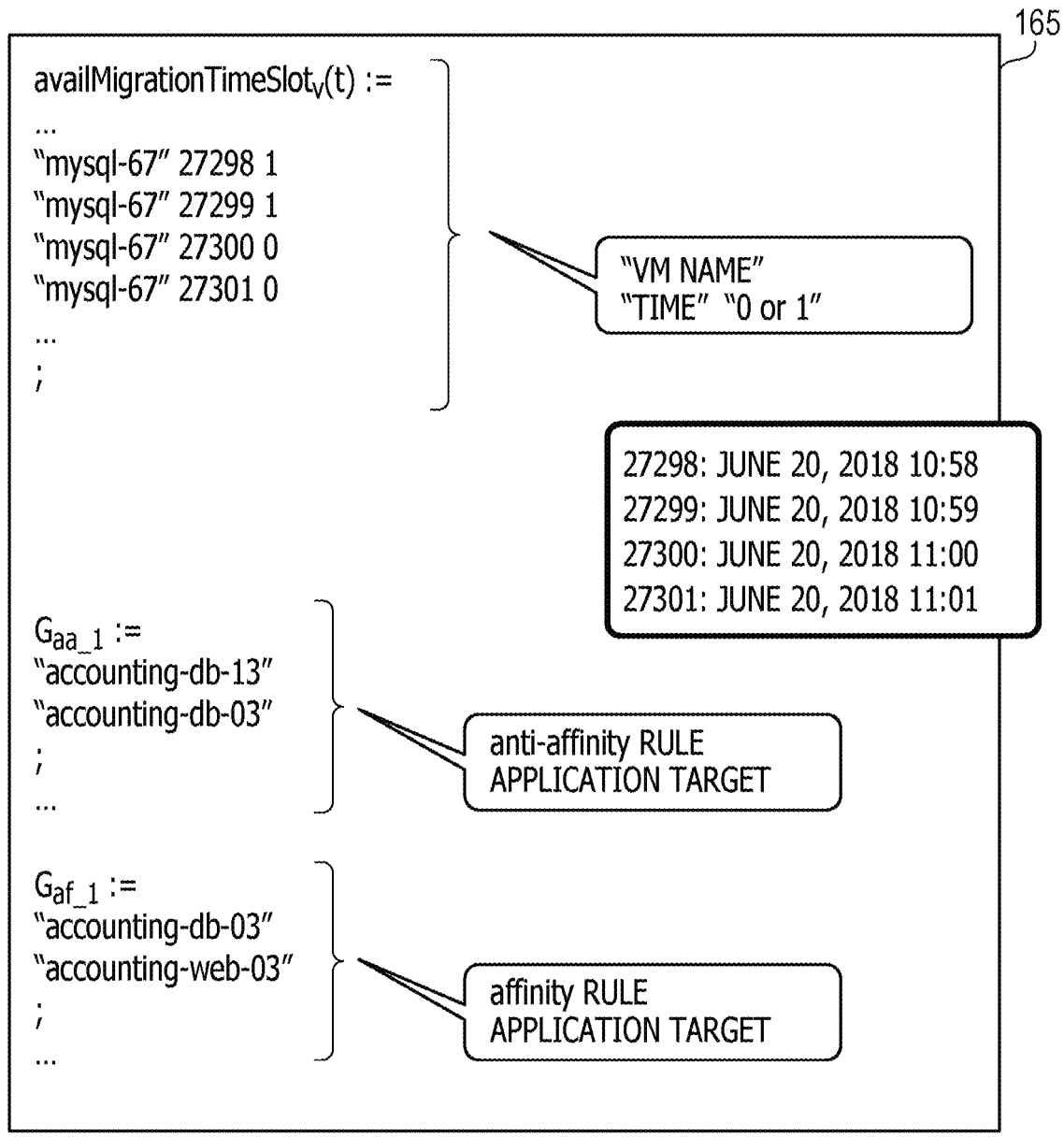
FIG. 31 is a diagram illustrating exemplary input data (part 5)

FIG. 31 is a diagram illustrating exemplary input data (part 5).

The input data 165 includes variables availMigrationTimeSlot$_v$(t), $G_{aa\_1}$, and $G_{af\_1}$.

The expression availMigrationTimeSlot$_v$(t):=. . . , ("mysql-67" 27298 1), ("mysql-67" 27299 1), ("mysql-67" 27300 0), ("mysql-67" 27301 0), . . . ; represents the LM execution allowable duration or LM execution avoidance duration for the virtual machine. The last value is "1" when the execution is allowed, or "0" when the execution is avoided. One record includes a set of "VM name", "time", and "0 or 1".

In FIG. 31, the time "27298" represents 10:58 on Jun. 20, 2018. The time "27299" represents 10:59 on Jun. 20, 2018. The time "27300" represents 11:00 on Jun. 20, 2018. The time "27301" represents 11:01 on Jun. 20, 2018.

The expression $G_{aa\_1}$:="accounting-db-13", "accounting-db-03"; represents the first group to which the anti-affinity rule is applied and the virtual machines belonging to the group. A second or later group to which the anti-affinity rule is to be applied is set in the same manner.

The expression $G_{af\_1}$:="accounting-db-03", "accounting-web-03"; represents the first group to which the affinity rule is applied and the virtual machines belonging to the group. A second or later group to which the affinity rule is to be applied is set in the same manner.

Figure 32:
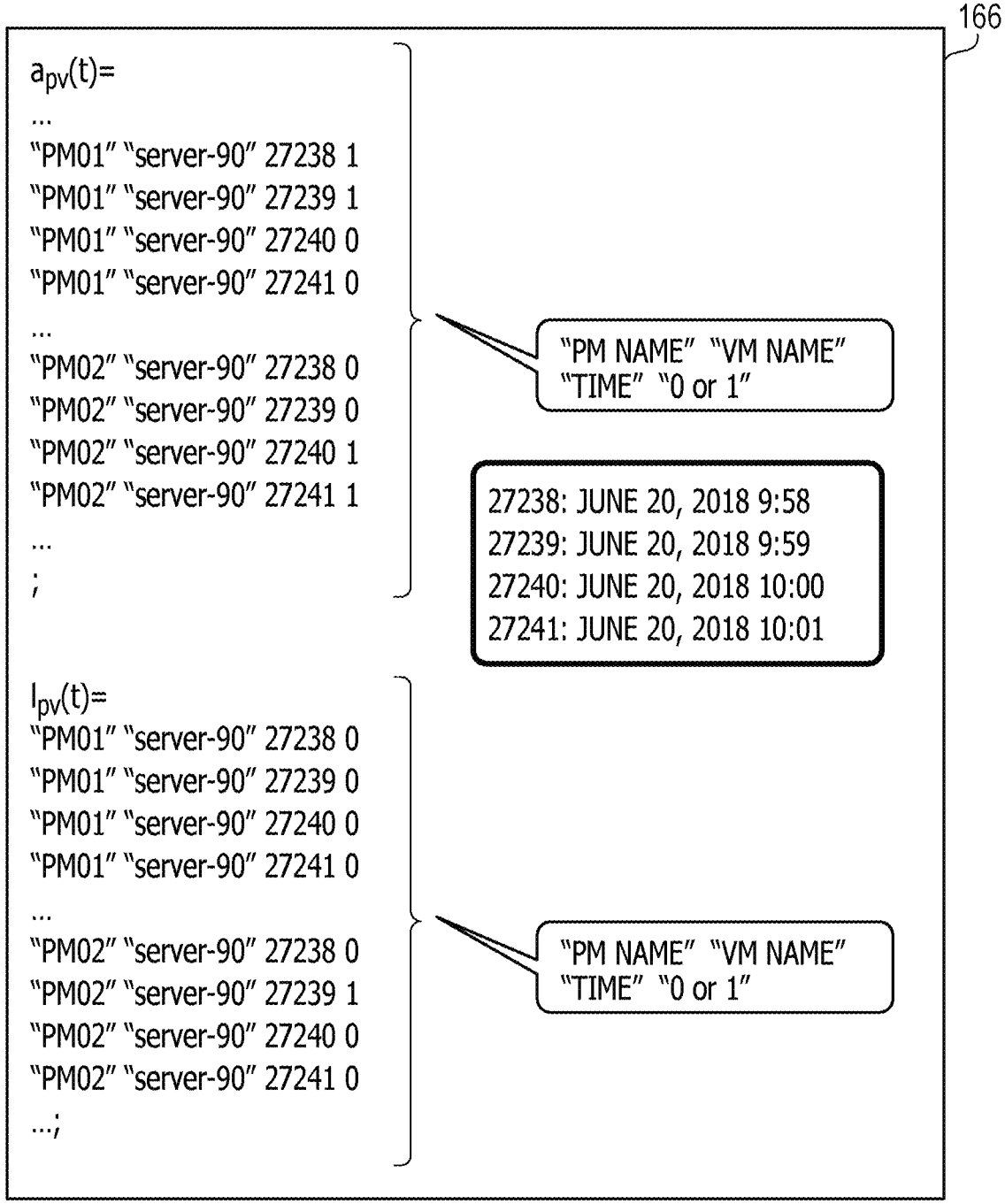
FIG. 32 is a diagram illustrating exemplary input data (part 6)

FIG. 32 is a diagram illustrating exemplary input data (part 6).

The input data 166 includes variables $a_{pv}$(t) and $I_{pv}$(t). Based on the existing LM schedule table 152, $a_{pv}$ and $I_{pv}$ in the input data 166 are set as constraints for a virtual machine with no LM execution date and time change request.

The expression $a_{pv}$(t)=. . . , ("PM01" "server-90" 27238 1), ("PM01" "server-90" 27239 1), ("PM01" "server-90" 27240 0), ("PM01" "server-90" 27241 0), . . . ; represents VMs running on each PM. One record includes a set of "PM name", "VM name", "time", and "0 or 1" (the value is "1" when the VM operates on the PM, or "0" otherwise).

In FIG. 32, the time "27238" represents 9:58 on Jun. 20, 2018. The time "27239" represents 9:59 on Jun. 20, 2018. The time "27240" represents 10:00 on Jun. 20, 2018. The time "27241" represents 10:01 on Jun. 20, 2018.

The expression $I_{pv}$(t)=("PM01" "server-90" 27238 0), ("PM01" "server-90" 27239 0), . . . , ("PM02" "server-90" 27238 0), ("PM02" "server-90" 27239 1), ("PM02" "server-90" 27240 0), . . . ; represents the LM completion time of each virtual machine to the migration destination physical machine. One record includes a set of "PM name", "VM name", "time", and "0 or 1" (the last value is "1" for a time at which LM of the VM to the PM is completed, or "0" otherwise).

Figure 33:
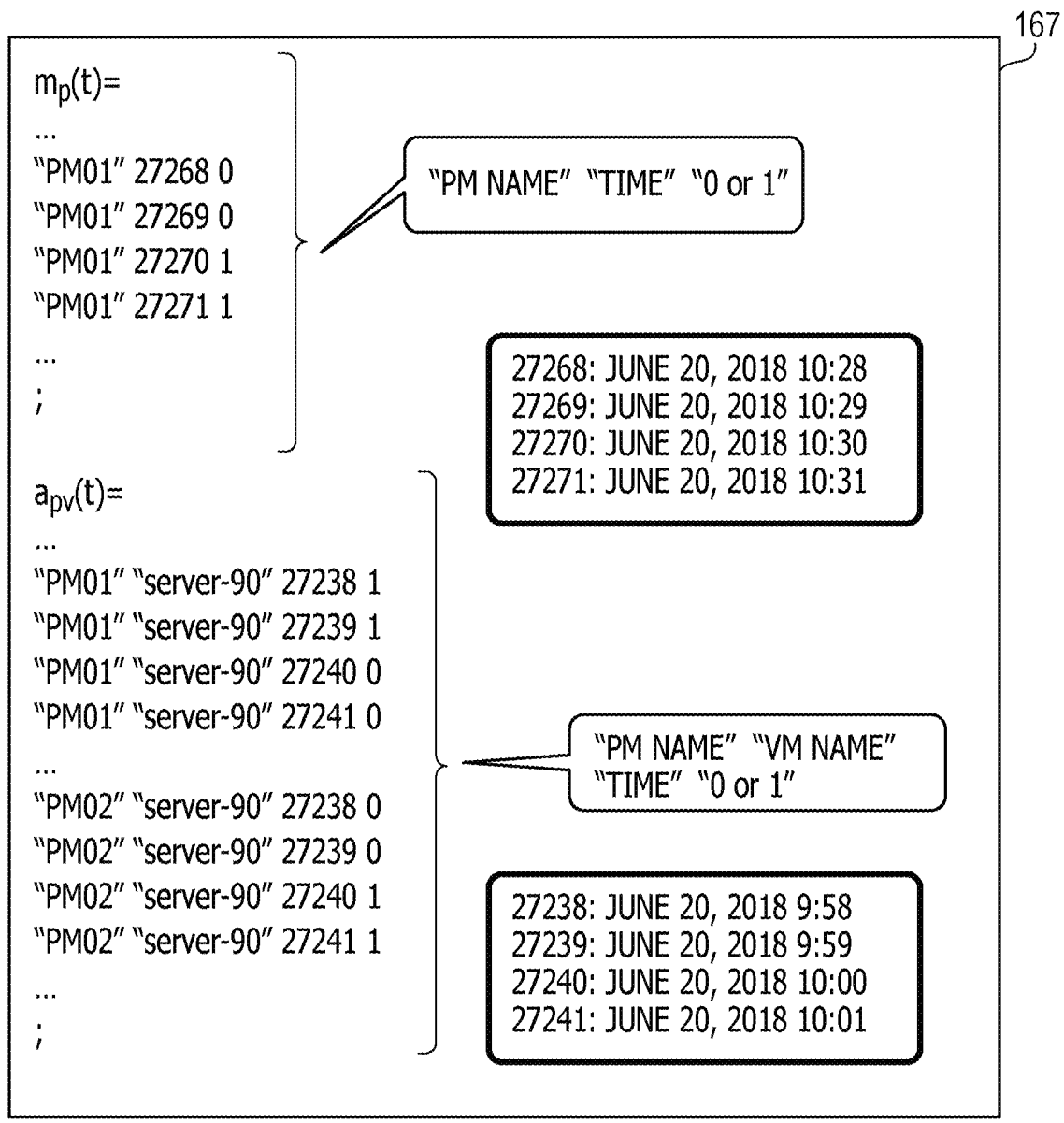
FIG. 33 is a diagram illustrating exemplary output data (part 1)

FIG. 33 is a diagram illustrating exemplary output data (part 1).

The solver unit 125 outputs output data 167 by solving the constraint satisfaction problem set by the constraint condition generation unit 124. The output data 167 includes variables $m_p(t)$ and $a_{pv}(t)$.

The expression $m_p(t)$=..., ("PM01" 27268 0), ("PM01" 27269 0), ("PM01" 27270 1), ("PM01" 27271 1), ...; represents the maintenance execution duration of each physical machine. One record includes a set of "PM name", "time", and "0 or 1" (the last value is "1" when the PM is under maintenance at the time, or "0" otherwise).

In FIG. 33, the time "27268" represents 10:28 on Jun. 20, 2018. The time "27269" represents 10:29 on Jun. 20, 2018. The time "27270" represents 10:30 on Jun. 20, 2018. The time "27271" represents 10:31 on Jun. 20, 2018.

The expression $a_{pv}(t)$=..., ("PM01" "server-90" 27238 1), ("PM01" "server-90" 27239 1), ("PM01" "server-90" 27240 0), ("PM01" "Server-90" 27241 0), ...; represents VMs running on each PM. One record includes a set of "PM name", "VM name", "time", and "0 or 1" (the value is "1" when the VM operates on the PM, or "0" otherwise).

In FIG. 33, the time "27238" represents 9:58 on Jun. 20, 2018. The time "27239" represents 9:59 on Jun. 20, 2018. The time "27240" represents 10:00 on Jun. 20, 2018. The time "27241" represents 10:01 on Jun. 20, 2018.

FIG. 34 is a diagram illustrating exemplary output data (part 2).

The solver unit 125 further outputs output data 168 by solving the constraint satisfaction problem set by the constraint condition generation unit 124. The output data 168 includes a variable $I_{pv}(t)$.

The expression $I_{pv}(t)$=..., ("PM01" "myspl-67" 27248 0), ("PM01" "myspl-67" 27249 0), ..., ("PM02" "myspl-67" 27248 0), ("PM02" "myspl-67" 27249 1), ("PM02" "myspl-67" 27250 0), ...; represents the LM completion time of each virtual machine to the migration destination physical machine. One record includes a set of "PM name", "VM name", "time", and "0 or 1" (the last value is "1" for a time at which LM of the VM to the PM is completed, or "0" otherwise).

In FIG. 34, the time "27238" represents 9:58 on Jun. 20, 2018. The time "27239" represents 9:59 on Jun. 20, 2018. The time "27240" represents 10:00 on Jun. 20, 2018. The time "27241" represents 10:01 on Jun. 20, 2018. The time "27248" represents 10:08 on Jun. 20, 2018. The time "27249" represents 10:09 on Jun. 20, 2018. The time "27250" represents 10:10 on Jun. 20, 2018. The time "27251" represents 10:11 on Jun. 20, 2018.

The solver unit 125 obtains the LM schedule of each virtual machine from the contents of the output data. For example, according to the output result of $I_{pv}(t)$, the end time of LM of "mysql-67" to "PM02" is "27249". According to the virtual machine configuration table 142, the LM turn-around time for the virtual machine with the virtual machine name "mysql-67" is 10 minutes. Accordingly, the solver unit 125 determines the LM schedule of "mysql-67" to be a duration of 10 time slots between the times "27240" to "27249".

The solver unit 125 converts a duration indicated by the output data into the format of year, month, day, hour, minute, and second to produce the maintenance schedule table 153 and the LM schedule table 154. As in the case of the solver unit 125, the schedule change unit 128 also produces a maintenance schedule table 153 and an LM schedule table 154. However, as described above, the schedule change unit 128 may use the function of the solver unit 125 to solve the semi-constraint satisfaction problem and to produce the maintenance schedule table 153 and the LM schedule table 154.

The scheduler 120 presents the LM schedule produced by the solver unit 125 or the schedule change unit 128 to the user, and prompts check by the user. The following describes an exemplary screen provided to the user terminal 500 by the management server 100.

Figure 35:
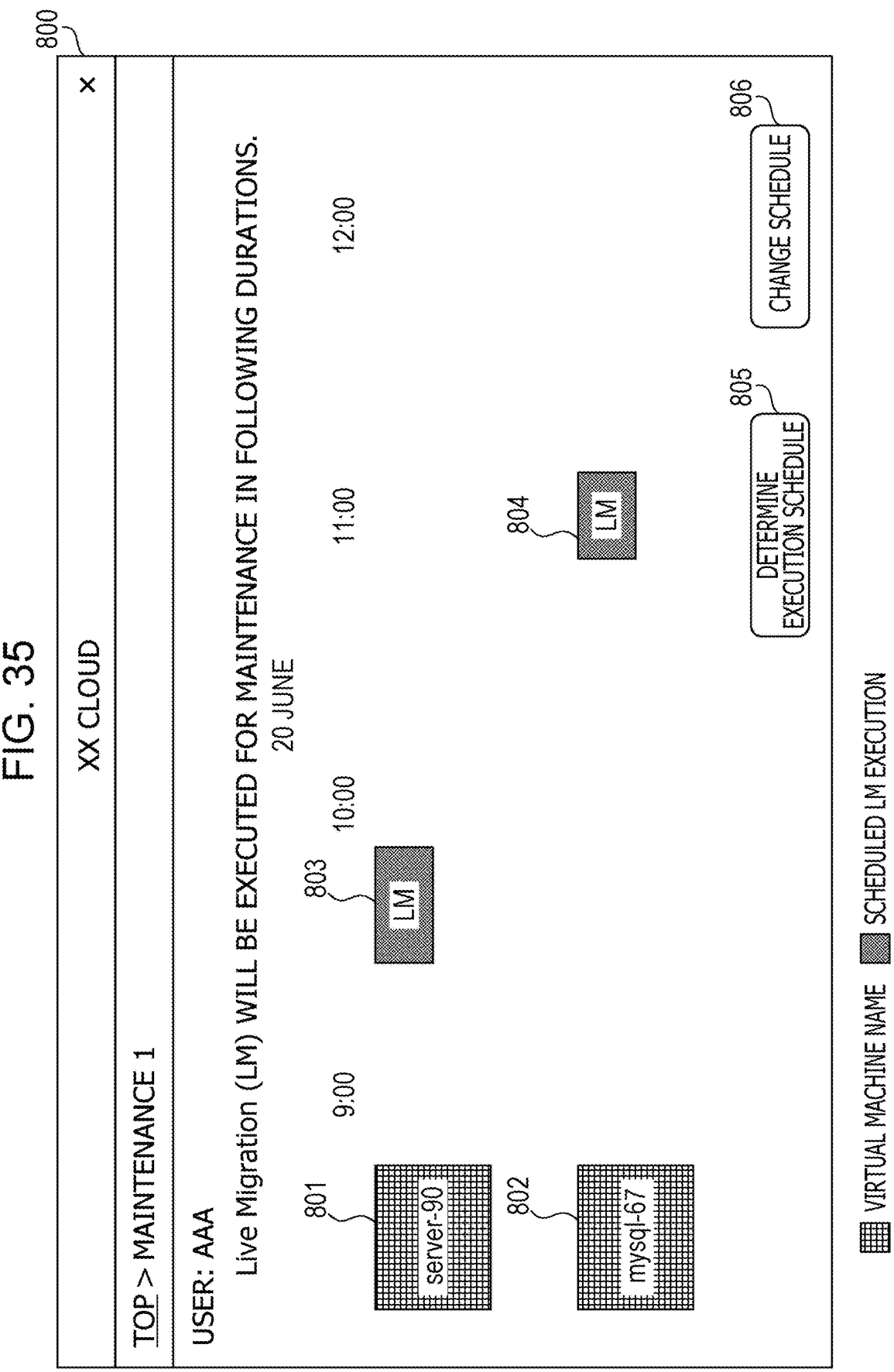
FIG. 35 is a diagram illustrating an exemplary LM schedule display screen.

FIG. 35 is a diagram illustrating an exemplary LM schedule display screen.

A screen 800 is an exemplary screen provided to the user terminal 500 by the management server 100 based on the LM schedule table 152 (existing schedule). The user terminal 500 receives screen information corresponding to the screen 800 from the management server 100, and displays, based on the screen information, the screen 800 on a display (display device) included in or coupled to the user terminal 500. For example, the user terminal 500 is used by a user with the user ID of "user3", and the user name of the user is "AAA".

The scheduler 120 specifies, based on the virtual machine configuration table 142 (or the virtual machine operation table 143), the user ID of a user of each virtual machine registered to the LM schedule table 152. Information such as the user name of a user and the address of a terminal corresponding to the user ID is stored in the RAM 102 or the HDD 103 in advance. The scheduler 120 refers to this information to specify a user name and the destination of screen information.

The screen 800 includes VM symbols 801 and 802, LM symbols 803 and 804, and buttons 805 and 806.

The VM symbols 801 and 802 each represent a virtual machine as an LM target used by the corresponding user. For example, the VM symbol 801 represents a virtual machine having the virtual machine name "server-90". The VM symbol 802 represents a virtual machine having the virtual machine name "mysql-67". In this example of the screen 800, the LM schedule of each virtual machine is illustrated with a temporally sequential positive direction aligned with the direction from the left side to the right side on rows of the VM symbols 801 and 802.

The LM symbols 803 and 804 each represent LM execution scheduled date and time of each virtual machine. For example, the LM symbol 803 indicates that LM of the virtual machine having the virtual machine name "server-90" is executed between 9:45 on Jun. 20, 2018 and 9:59 on the same day. For example, the LM symbol 804 indicates that LM of the virtual machine having the virtual machine name "mysql-67" is executed between 10:55 on Jun. 20, 2018 and 11:04 on the same day.

The button 805 is a button for inputting confirmation of the LM schedules on the screen 800. When having received an input through the button 805 by the user, the user terminal 500 transmits, for each virtual machine displayed on the screen 800, an LM schedule confirmation message to the management server 100.

The button 806 is a button for transition to a change input screen for changing the LM schedules on the screen 800.

Figure 36:
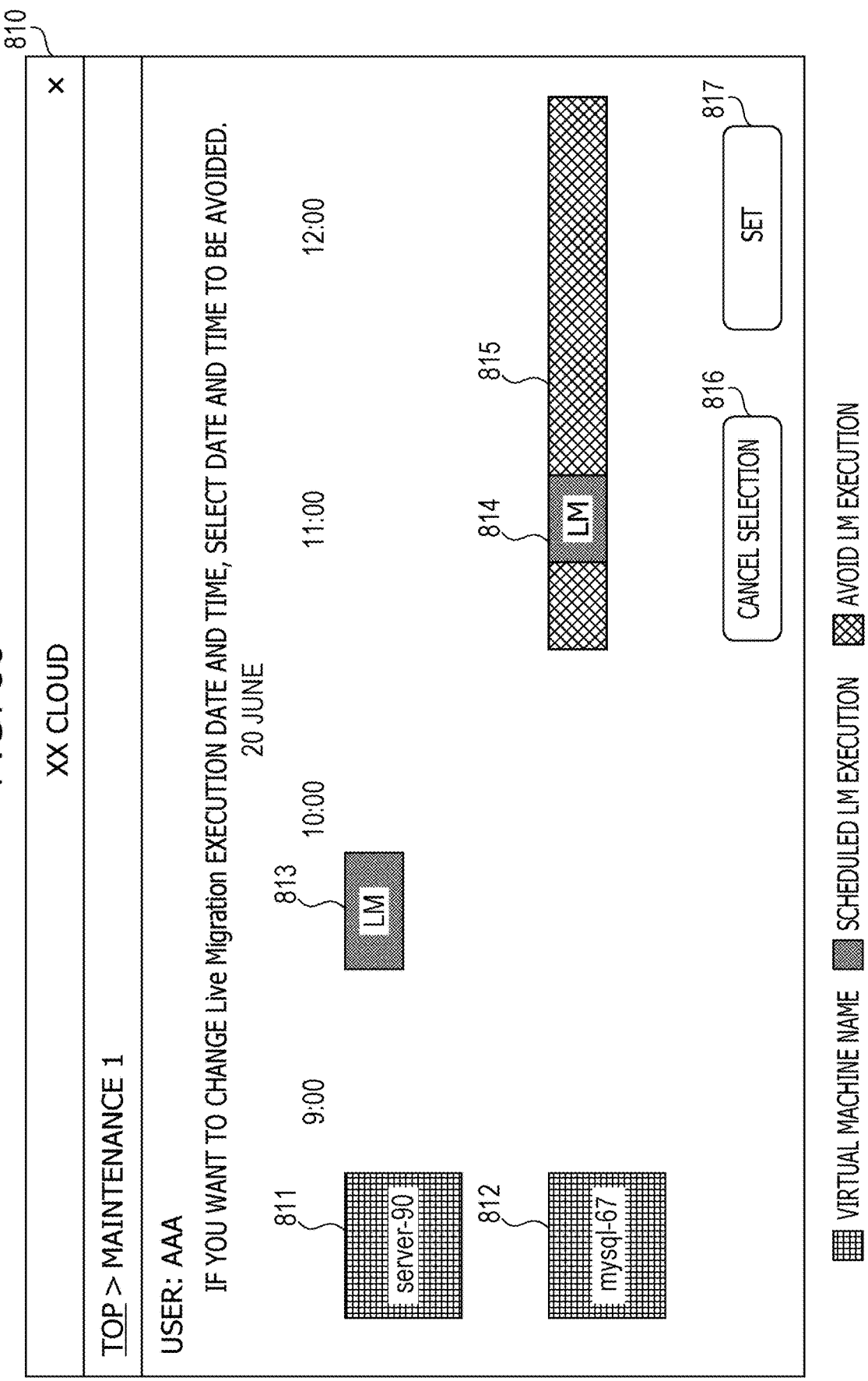
FIG. 36 is a diagram illustrating an exemplary LM schedule change input screen.

FIG. 36 is a diagram illustrating an exemplary LM schedule change input screen.

A screen 810 is a screen for inputting the content of a request of change to the LM schedule on the screen 800. The screen 810 is a screen provided to the user terminal 500 by the management server 100 in accordance with an input through the button 806 by the user. The screen 810 includes VM symbols 811 and 812, LM symbols 813 and 814, an LM execution avoidance date and time symbol 815, and buttons 816 and 817.

The VM symbol 811 corresponds to the VM symbol 801. The VM symbol 812 corresponds to the VM symbol 802. The LM symbol 813 corresponds to the LM symbol 803. The LM symbol 814 corresponds to the LM symbol 804.

The LM execution avoidance date and time symbol 815 is a symbol for receiving selection of LM execution avoidance date and time by the user. For example, the user disposes the LM execution avoidance date and time symbol 815 on the row of a desired virtual machine by using a pointing device coupled to the user terminal 500. Then, the user selects LM execution avoidance date and time for the virtual machine by changing the width of the LM execution avoidance date and time symbol 815 in the lateral direction (row direction) by using the pointing device. The user may dispose the LM execution avoidance date and time symbol 815 over the LM symbol 814. In this example of the LM execution avoidance date and time symbol 815, the duration between 10:40 on Jun. 20, 2018 and 12:59 on the same day is selected as LM execution avoidance date and time for the virtual machine having the virtual machine name "mysql-67".

The button 816 is a button for canceling selection of LM execution avoidance date and time through the LM execution avoidance date and time symbol 815.

The button 817 is a button for setting LM execution avoidance date and time selected by using the LM execution avoidance date and time symbol 815. When having received an input through the button 817, the user terminal 500 transmits, to the management server 100, a message including the LM execution date and time change request information 133 indicating the selected LM execution avoidance date and time of a virtual machine.

When having received the LM execution date and time change request information 133 through the screen 810, the management server 100 reproduces constraint information related to the LM execution time, and updates the LM schedule of a virtual machine for which LM execution date and time change request information 133 is inputted. When an LM schedule that satisfies the constraint information may not be produced based on the reproduced constraint information, the management server 100 generates semi-constraint information from the constraint information and updates the LM schedule. The management server 100 presents the updated LM schedule to the user again.

Figure 37:
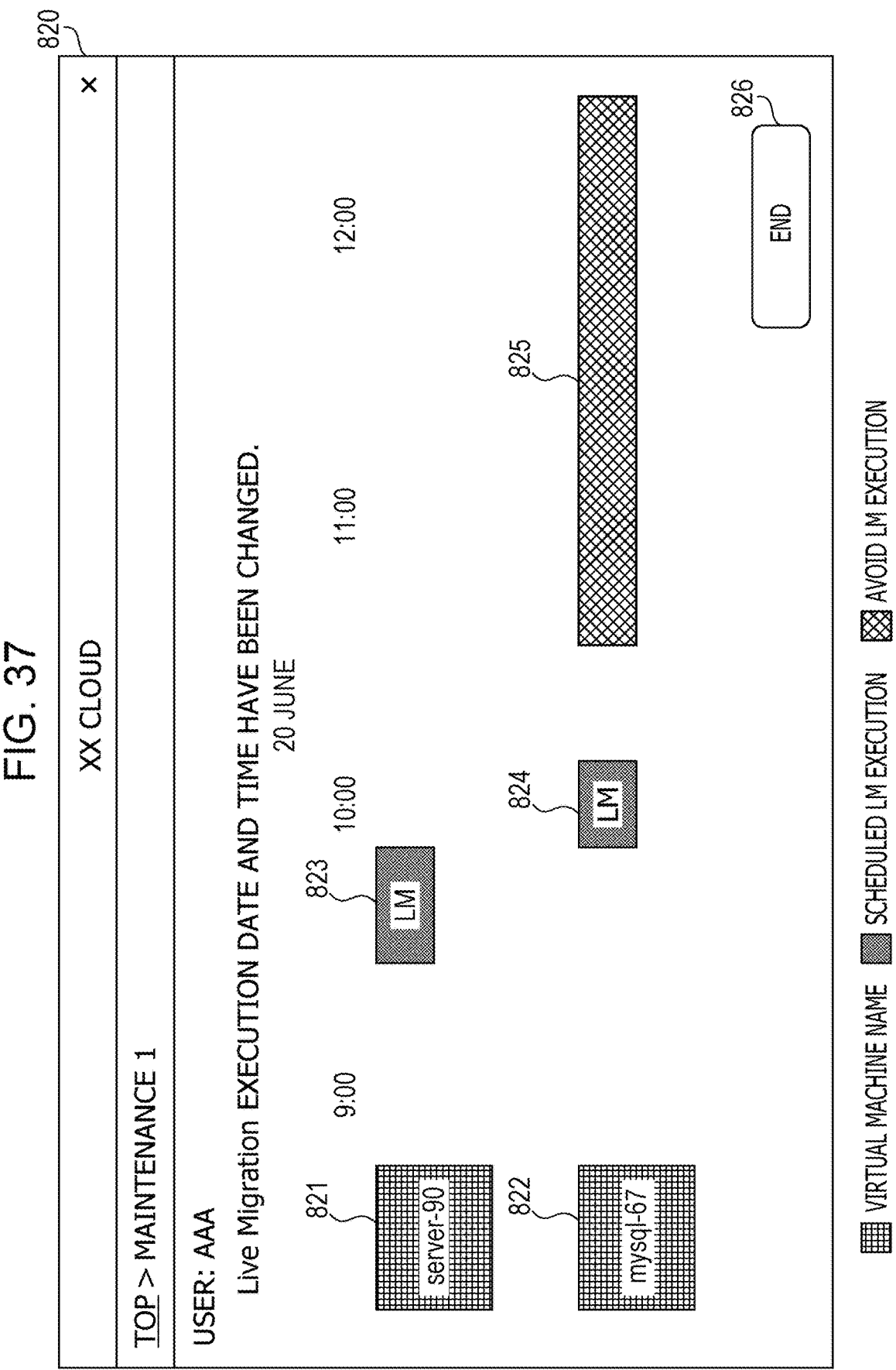
FIG. 37 is a diagram illustrating an exemplary LM schedule change result display screen.

FIG. 37 is a diagram illustrating an exemplary LM schedule change result display screen.

A screen 820 is an exemplary screen provided to the user terminal 500 by the management server 100 based on the LM schedule table 154 (changed schedule). The screen 820 displays an LM schedule readjusted in accordance with selection of LM execution avoidance date and time through the screen 810. The screen 820 includes VM symbols 821 and 822, LM symbols 823 and 824, an LM execution avoidance date and time symbol 825, and a button 826.

The VM symbol 821 corresponds to the VM symbol 801. The VM symbol 822 corresponds to the VM symbol 802. The LM symbol 823 corresponds to the LM symbol 803.

The LM symbol 824 indicates that LM of the virtual machine having the virtual machine name "mysql-67" is executed between 10:00 on Jun. 20, 2018 and 10:09 on the same day.

The LM execution avoidance date and time symbol 825 corresponds to the LM execution avoidance date and time symbol 815.

No LM execution avoidance date and time is selected through the screen 810 for the virtual machine having the virtual machine name "server-90", and thus an initially determined LM schedule of the virtual machine having the virtual machine name "server-90" is not updated. However, the LM execution date and time may be changed for the virtual machine having the virtual machine name "server-90".

The button 826 is a button for ending check of the LM schedules of the virtual machines. When having received an input through the button 826, the user terminal 500 closes the screen 820.

In the above-described examples, the user terminal 500 is provided with the screens 800, 810, and 820. The user terminal 600 is provided with screens for checking the LM schedule of a virtual machine used by a user of the user terminal 600 in the same manner.

FIG. 38 is a diagram illustrating an exemplary maintenance schedule screen.

A screen 900 is an exemplary screen provided to the operator terminal 700 by the management server 100 based on the maintenance schedule table 153 and the LM schedule table 154 (changed schedule). The screen 900 displays a maintenance schedule of a physical machine corresponding to the updated LM schedule table 154 displayed on the screen 820. The operator terminal 700 receives screen information for drawing the screen 900 from the management server 100, and displays, based on the screen information, the screen 900 on a display (display device) included in or connected to the operator terminal 700. For example, the operator name of a user is "aaa".

The screen 900 includes PM symbols 901 and 902, VM schedule symbols 911 and 912, and a maintenance symbol 913.

The PM symbols 901 and 902 each represent a physical machine as a maintenance target. For example, the PM symbol 901 represents the physical machine having the physical machine name "PM01". The PM symbol 902 represents the physical machine having the physical machine name "PM02". In this example of the screen 900, the operation schedule, LM schedule, and maintenance schedule of any virtual machine on each physical machine are illustrated with a temporally sequential positive direction aligned with the direction from the left side to the right side on rows of the PM symbols 901 and 902.

The VM schedule symbols 911 and 912 represent the operation schedule and LM schedule of each virtual machine. The VM schedule symbols 911 and 912 reflect the contents of the LM schedule table 154 after rescheduling. For example, the VM schedule symbol 911 represents the operation schedule of each of a plurality of virtual machines on the physical machine having the physical machine name "PM01", and the LM schedule of each virtual machine. The VM schedule symbol 912 represents the operation schedule of each of a plurality of virtual machines on the physical machine having the physical machine name "PM02", and the LM schedule of each virtual machine. With the VM schedule symbols 911 and 912, the operator knows that each virtual machine operates the physical machine having the physical machine name "PM01" before LM execution, and operates on the physical machine having the physical machine name "PM02" after LM execution.

The maintenance symbol 913 represents the maintenance schedule of a physical machine. The maintenance symbol 913 reflects on the content of the maintenance schedule table 153, and represents the maintenance schedule of the physical machine having the physical machine name "PM01". In this example of the maintenance symbol 913 indicates that maintenance is performed on the physical machine having the physical machine name "PM01" in the duration between 10:30 on Jun. 20, 2018 and 11:29 on the same day.

Thus, when generating the rescheduling result, the management server 100 determines a maintenance period for each physical machine in the maintenance execution duration based on the semi-constraint satisfaction problem (semi-constraint information) and the maintenance turn-around time of each of the plurality of physical machines. The management server 100 outputs the period thus determined to the operator terminal 700, so that the period during which maintenance of each physical machine after rescheduling is to be performed may be appropriately presented to the operator.

As described above, the management server 100 accepts a request from the user to change the scheduled LM execution time adjusted in advance for the maintenance of the cloud infrastructure accompanying the LM of the virtual machine. The management server 100 constrains the requested virtual machine to perform LM in a desired time slot, and performs rescheduling for the other virtual machines so as not to change the schedule. In this event, if the requirements to be met on the operation side during maintenance work are not satisfied, the management server 100 extracts the minimal unsatisfiable core related to the LM execution time, and performs rescheduling by removing the constraints therefrom for the lower priority virtual machine. This makes it possible to perform rescheduling while minimizing changes to the LM schedule and suppressing the influence on the existing migration schedule of the virtual machine.

In the system operation, there is no guarantee that the LM and the maintenance of the physical machine will be performed as scheduled according to the schedule initially determined by the management server 100. For example, as described above, there may be a demand for changing the initially scheduled LM time slot of the virtual machine to another time slot due to a change in the scheduled use of the virtual machine by the user. As described above, in the system operation, the schedule has to be modified according to a change in the situation.

However, in order to correct the schedule so as to satisfy the constraints, changes may have to be made to those other than the correction factor.

As a rescheduling method, rescheduling by a dynamic weighted constraint satisfaction problem is also conceivable. As for the rescheduling method using the dynamic weighted constraint satisfaction problem, for example, the following documents 2 and 3 serve as a useful reference.

(Document 2) Japanese Laid-open Patent Publication No. 2005-267591.

(Document 3) Hattori, Ito, Ozono and Shintani, "A Nurse Scheduling System Based on Dynamic Constraint Satisfaction Problem", In Proc. IEA/AIE 2005, pp. 799-808, 2005.

Rescheduling in the methods of Documents 2 and 3 deals with a dynamic constraint satisfaction problem in which a weight is added to a constraint and a solution is obtained so that the total weight of the violating constraints is minimized. However, in the methods of Documents 2 and 3, it is not easy to uniquely determine the optimum weight value for the constraint. This is because the weight depends on the rescheduling problem. Therefore, the methods of Documents 2 and 3 require weight adjustment for each problem in order to obtain an optimal rescheduling result. When rescheduling fails (unsatisfiable), there is no guarantee that the weight may be satisfied by appropriate weight adjustment, and optimal weight search for a large-scale problem becomes unrealistic.

Therefore, when the constraint satisfaction problem given at the time of LM rescheduling is unsatisfiable, the management server 100 extracts a minimal unsatisfiable core from the constraint set in the constraint satisfaction problem. The management server 100 creates k types of rescheduling problems (semi-constraint satisfaction problems) from which one constraint included in the minimal unsatisfiable core is removed, and solves the k types of rescheduling problems. In this event, as described above, the management server 100 uses the objective function expressed by Expressions (18) and (19) in order to suppress the influence of the change on the existing LM schedule. Then, the management server 100 employs a result that may minimize the influence of the change among the solved problems. This makes it possible to perform rescheduling while accepting the change request of the change target virtual machine and suppressing the influence on the existing schedule of other virtual machines.

In this event, the rescheduling processing may be accelerated by excluding not all but some of the constraints belonging to the minimal unsatisfiable core, compared with excluding all the constraints belonging to the minimal unsatisfiable core. For example, by selecting constraints to be excluded according to the priority of the virtual machine, it is possible to reduce the possibility that constraints on virtual machines that execute important processing are to be excluded, and to further suppress the influence on the use of virtual machines.

The information processing according to the first embodiment is achievable through execution of a computer program by the processing unit 12. The information processing according to the second embodiment is achievable through execution of a computer program by the CPU 101. Each computer program may be recorded in the computer-readable recording medium 93.

For example, each computer program may be circulated by distributing the recording medium 93 in which the computer program is recorded. Alternatively, each computer program may be stored in another computer and distributed through a network. For example, the computer may store (install) each computer program recorded in the recording medium 93 or each computer program received from another computer in a storage device such as the RAM 102 or the HDD 103, read each computer program from the storage device, and execute the computer program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:

for an existing schedule indicating time slots during which a plurality of virtual machines are desired to be migrated between a plurality of physical machines, acquiring change information indicating a change of first time slots, among the time slots, during which a first group of virtual machines, among the plurality of virtual machines, are to be migrated;

generating constraint information including a set of constraints regarding the change information and second time slots, among the time slots, during which a second group of virtual machines other than the first group of virtual machines are to be migrated;

generating a plurality of semi-constraint information items, a semi-constraint information item, among the plurality of semi-constraint information items, generated by selecting a group of constraints, among the set of constraints, to be excluded, based on a minimal unsatisfiable (UNSAT) core for a migration time of a virtual machine, among the plurality of virtual machines;

generating, the semi-constraint information item, a plurality of respective rescheduling results by rescheduling migrations of the plurality of virtual machines; and selecting a first rescheduling result indicating a first rescheduling, from among the respective rescheduling results, which minimizes a difference between a requested first time slot indicated by the change information and a new first scheduled time slot after the first rescheduling.

2. The non-transitory, computer-readable recording medium of claim 1, wherein, a constraint included in the minimal UNSAT core is selected to be extracted from the group of constraints as the exclusion target constraint.

3. The non-transitory, computer-readable recording medium of claim 2, wherein the constraint included in the minimal UNSAT core is selected as the exclusion target constraint, based on a priority of a virtual machine, among respective priorities of the plurality of virtual machines.

4. The non-transitory, computer-readable recording medium of claim 1, wherein, the, selecting further includes a second rescheduling result indicating a second rescheduling, from among the rescheduling results, which reduces a first difference between a first time slot, among the first time slots indicated by the change information, and a second time slot, among the second time slots of the second virtual machines, or reduces a second difference between a first time slot, among the first time slots indicated by the change information and the new first scheduled time slot indicated by the first rescheduling result.

5. The non-transitory, computer-readable recording medium of claim 4, wherein, the selecting selects the second rescheduling result that minimizes either one of the first difference or the second difference.

6. The non-transitory, computer-readable recording medium of claim 1, wherein the change information indicating the change of first time slots includes information indicating a first time slot, among the first time slots, in which a migration of a first virtual machine, among the first virtual machines is allowed or a first time slot, among the first time slots, in which a migration of a first virtual machine, among the first virtual machines, is to be avoided.

7. The non-transitory, computer-readable recording medium of claim 1, wherein the constraint information includes, respective constraints related to maintenance periods of the plurality of physical machines, wherein during a maintenance period, among the maintenance periods, a maintenance is to be performed on a physical machine, among the plurality of physical machines, respective configurations of the plurality of physical machines and the plurality of virtual machines, and respective turnaround times for a migration of a virtual machine, among the plurality of virtual machines, between the plurality of physical machines.

8. The non-transitory, computer-readable recording medium of claim 7, wherein, for the first rescheduling result, a time period for performing a maintenance on a physical machine, among the plurality of physical machines is determined, based on maintenance periods indicated by the constraint information, the plurality of semi-constraint information items, and a turnaround time for a maintenance of a physical machine, among the plurality of physical machines.

9. An apparatus comprising:
a memory; and
a processor coupled to the memory and configured to:
for an existing schedule indicating time slots during which a plurality of virtual machines are desired to be migrated between a plurality of physical machines, acquire change information indicating a change of first time slots, among the time slots, during which a first group of virtual machines, among the plurality of virtual machines, are to be migrated;

generate constraint information including a set of constraints regarding the change information and second time slots, among the time slots, during which a second group of virtual machines other than the first group of virtual machines are to be migrated;

generating a plurality of semi-constraint information items, a semi-constraint information item, among the plurality of semi-constraint information items, generated by selecting a group of constraints, among the set of constraints, to be excluded, based on a minimal unsatisfiable (UNSAT) core for a migration time of a virtual machine, among the plurality of virtual machines;

generating, the semi-constraint information item, a plurality of respective rescheduling results by rescheduling migrations of the plurality of virtual machines; and selecting a rescheduling result indicating to a rescheduling, from among the respective rescheduling results, which minimizes a difference between a requested first time slot indicated by the change information and a new scheduled time slot after the rescheduling.

10. A method performed by a computer, the method comprising:

for an existing schedule indicating time slots during which a plurality of virtual machines are desired to be migrated between a plurality of physical machines, acquiring change information indicating a change of first time slots, among the time slots, during which a first group of virtual machines, among the plurality of virtual machines, are to be migrated;

generating constraint information including a set of constraints regarding the change information and second time slots, among the time slots, during which a second group of virtual machines other than the first group of virtual machines are to be migrated;

generating a plurality of semi-constraint information items, a semi-constraint information item, among the plurality of semi-constraint information items, generated by selecting a group of constraints, among the set of constraints, to be excluded, based on a minimal unsatisfiable (UNSAT) core for a migration time of a virtual machine, among the plurality of virtual machines;

generating, for the semi-constraint information item, a plurality of respective rescheduling results by rescheduling migrations of the plurality of virtual machines; and selecting a rescheduling result indicating to a rescheduling, from among the respective rescheduling results, which minimizes a difference between a requested first time slot indicated by the change information and a new scheduled time slot after the rescheduling.

* * * * *